(12) United States Patent
Kelley et al.

(10) Patent No.: US 7,746,535 B2
(45) Date of Patent: Jun. 29, 2010

(54) BLIND CONNECTOR FOR REARVIEW MIRROR

(75) Inventors: Julie A. Kelley, Grand Rapids, MI (US);
Andrew J. LeVesque, Holland, MI (US); Kenton J. Ypma, Hudsonville, MI (US); Kristi L. Hooper, Grandville, MI (US); William R. Spence, Holland, MI (US); John B. Ostreko, Hudsonville, MI (US); Peter Wm. VanderWel, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 68 days.

(21) Appl. No.: 12/139,956

(22) Filed: Jun. 16, 2008

(65) Prior Publication Data

US 2008/0310006 A1 Dec. 18, 2008

Related U.S. Application Data

(60) Provisional application No. 60/944,300, filed on Jun. 15, 2007.

(51) Int. Cl.
*G02F 1/153* (2006.01)
(52) U.S. Cl. ...................................... 359/267
(58) Field of Classification Search ................ 359/265, 359/267; 361/748
See application file for complete search history.

(56) References Cited

U.S. PATENT DOCUMENTS

| 5,455,716 | A | 10/1995 | Suman et al. |
| 6,170,956 | B1 | 1/2001 | Rumsey et al. |
| 6,239,899 | B1 | 5/2001 | DeVries et al. |
| 6,428,172 | B1 | 8/2002 | Hutzel et al. |
| 7,266,204 | B2* | 9/2007 | Watson et al. ................. 381/86 |
| 2005/0174663 | A1* | 8/2005 | Carter et al. ................ 359/879 |

FOREIGN PATENT DOCUMENTS

WO 2004103773 12/2004

* cited by examiner

*Primary Examiner*—Joseph Martinez
(74) *Attorney, Agent, or Firm*—Price, Heneveld, Cooper, DeWitt & Litton, LLP

(57) ABSTRACT

A rearview mirror assembly comprising a rear housing section with wiring connected to a first electrical connection device and a circuit board with a second electrical connection device, with first electrical connection device and the second electrical connection device being configured to automatically mate when the circuit board and the rear housing section are moved relatively towards each other. The rearview mirror assembly can also include a circuit board with a third electrical connection device and a reflective element with a fourth electrical connection device, with third electrical connection device and the fourth electrical connection device being configured to automatically mate when the circuit board and the reflective element are moved relatively towards each other.

41 Claims, 22 Drawing Sheets

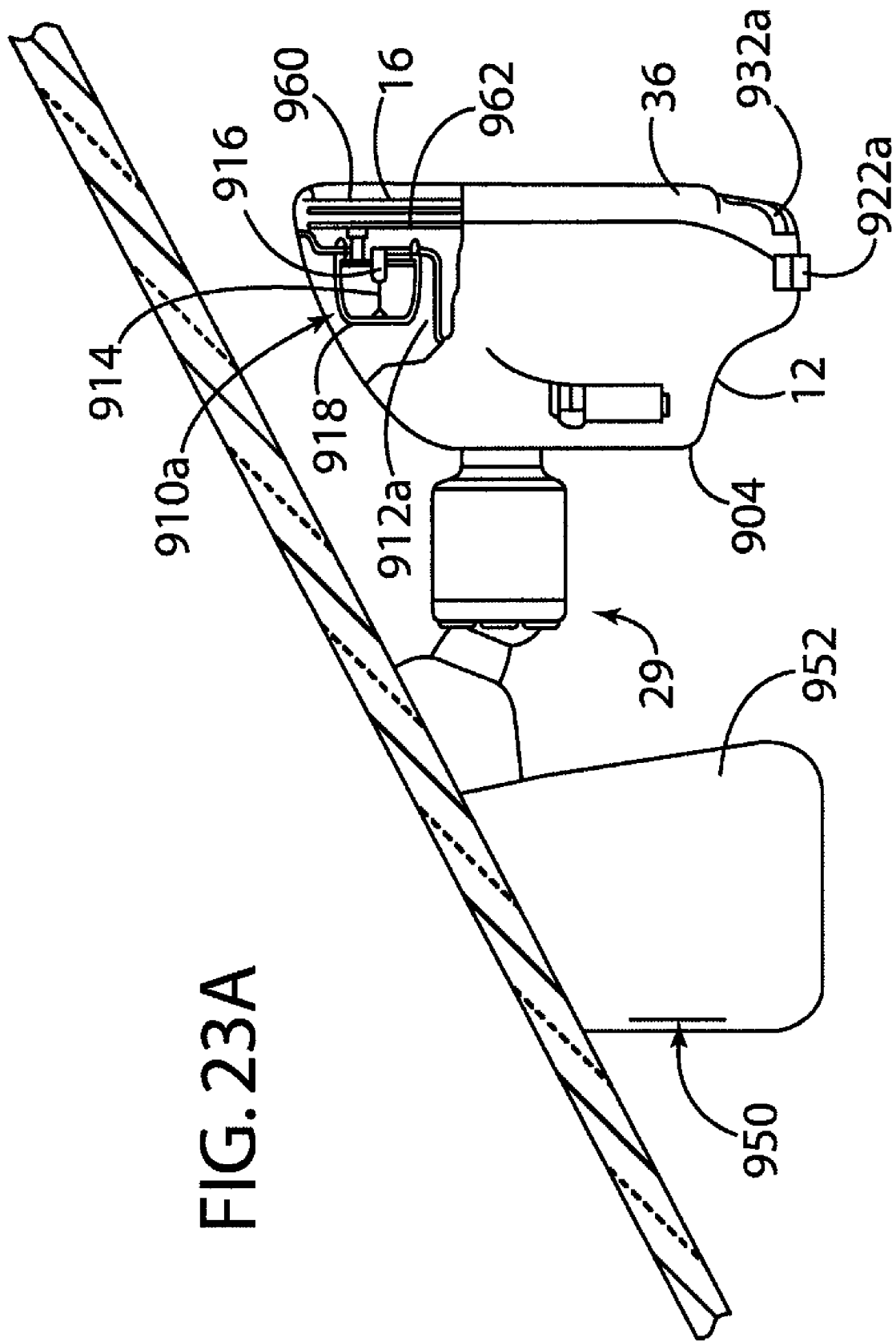

BLIND CONNECTOR FOR REARVIEW MIRROR

CROSS REFERENCE TO RELATED APPLICATION

This application claims the benefit of U.S. Provisional Application No. 60/944,300, filed Jun. 15, 2007.

FIELD OF THE INVENTION

The present invention concerns rearview mirrors, and more particularly relates to a blind connector for a rearview mirror.

SUMMARY OF THE PRESENT INVENTION

An aspect of the present invention is to provide a method of constructing a rearview mirror assembly comprising providing a rear housing section with wiring connected to a first electrical connection device, providing a circuit board with a second electrical connection device, and moving the circuit board and the rear housing section relatively towards each other to automatically mate the first electrical connection device and the second electrical connection device.

Another aspect of the present invention is to provide a rearview mirror assembly comprising a rear housing section with wiring connected to a first electrical connection device and a circuit board with a second electrical connection device. The first electrical connection device and the second electrical connection device are configured to automatically mate when the circuit board and the rear housing section are moved relatively towards each other.

Yet another aspect of the present invention is to provide a method of constructing a rearview mirror assembly comprising providing a circuit board with a first electrical connection device, providing a reflective element with a second electrical connection device, and moving the circuit board and the reflective element relatively towards each other to automatically mate the first electrical connection device and the second electrical connection device.

A further aspect of the present invention is to provide a rearview mirror assembly comprising a circuit board with a first electrical connection device and a reflective element with a second electrical connection device. The first electrical connection device and the second electrical connection device are configured to automatically mate when the circuit board and the reflective element are moved relatively towards each other.

These and other aspects, objects, and features of the present invention will be understood and appreciated by those skilled in the art upon studying the following specification, claims, and appended drawings.

BRIEF DESCRIPTION OF DRAWINGS

FIG. 23A is an elevational view of the side of the interior rearview mirror system constructed according to the present invention connected to a windshield.

DETAILED DESCRIPTION OF PREFERRED EMBODIMENTS

Figure 1:
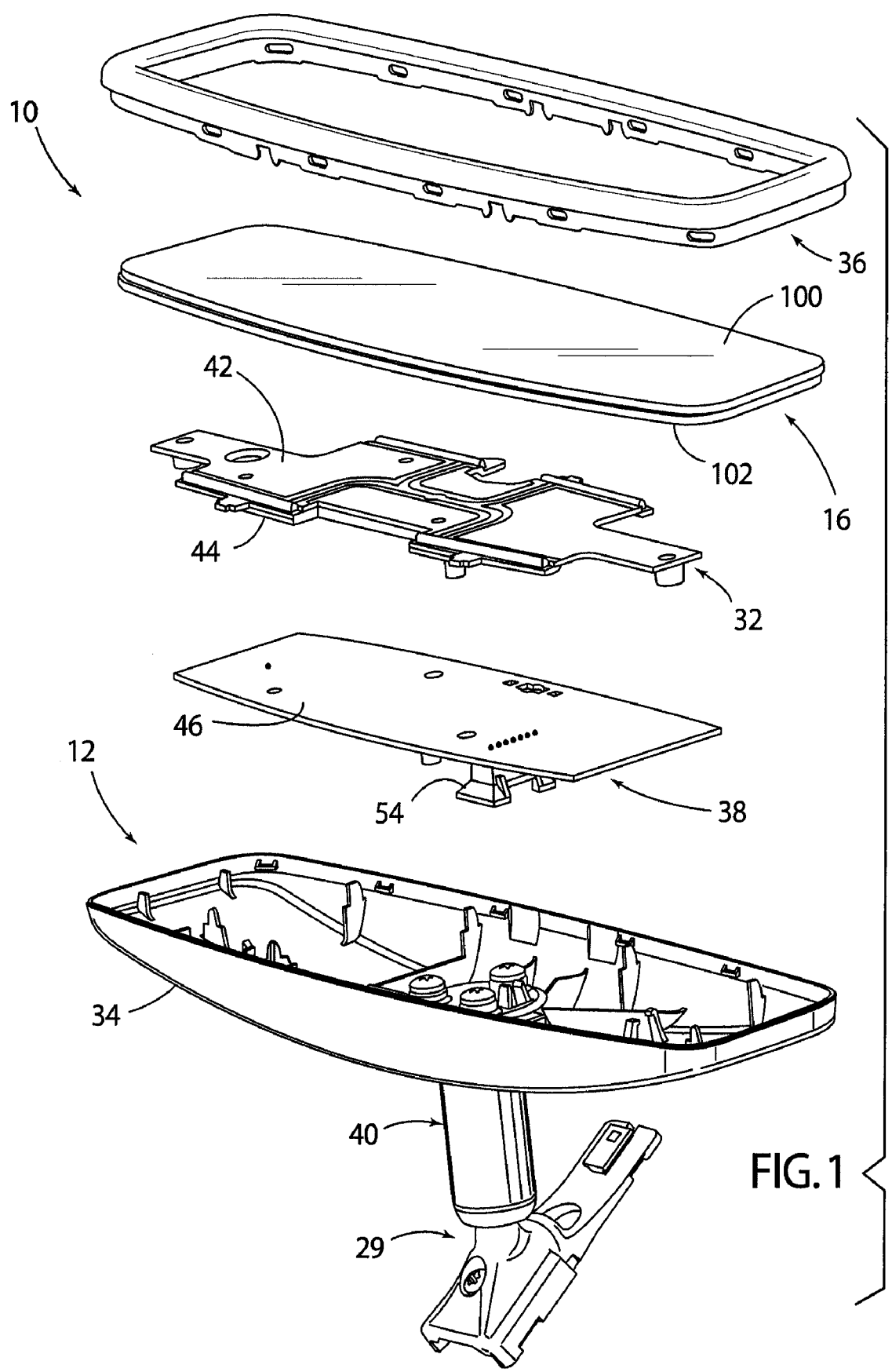
FIG. 1 is an exploded perspective view of a rearview mirror of the present invention.

Reference will now be made in detail to the present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as viewed in FIG. 1. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

The reference number 10 (FIG. 1) generally designates a rearview mirror assembly for a vehicle embodying the present invention. In the illustrated example, the rearview mirror assembly 10 comprises a housing 12 including a rear housing section 34 and a bezel 36, and a mounting bracket 29 connecting the housing 12 to a vehicle. The housing includes a circuit board 38, a carrier plate 32 and a reflective element 16 therein. The rear housing section 34 includes wiring 50 connected to a first electrical connection device 52. The circuit board 38 includes a second electrical connection device 54. The first electrical connection device 52 and the second electrical connection device 54 are configured to automatically mate when the circuit board 38 and the rear housing section 34 are moved relatively towards each other.

The illustrated rearview mirror assembly 10 of the present invention can be used in an interior rearview mirror. When the rearview mirror assembly 10 is used in an interior rearview mirror, the rearview mirror assembly 10 is preferably connected to the mounting bracket 29, which is adapted to be mounted inside the vehicle in a location proximate to or on a front windshield of the vehicle. The interior rearview mirror can have a single ball mount or a double ball mount 40 (see FIGS. 1 and 3-5). An example of a rearview mirror assembly connected to a mounting bracket having a single ball mount is disclosed in U.S. Pat. No. 6,467,919 entitled MIRROR WITH SPLIT BALL MOUNT AND HOLD-OPEN DEVICE, the entire contents of which are hereby incorporated herein by reference. An example of a rearview mirror assembly connected to a mounting bracket having a double ball mount is disclosed in U.S. Patent Application Publication No. 2005/0174663 entitled REARVIEW MIRROR WITH INTEGRATED FRAME, the entire contents of which are hereby incorporated herein by reference. The mounting bracket 29 is connected to the windshield as discussed above and/or a headliner of the vehicle as is well know to those skilled in the art and as disclosed in U.S. Pat. Nos. 6,467,919 and 5,377,948.

In the illustrated example, the housing 12 of the rearview mirror assembly 10 includes the carrier plate 32 located behind the reflective element 16. The carrier plate 32 can include the circuit board 38 connected thereto. If the rearview mirror assembly 10 is used in an interior rearview mirror, the carrier plate 32 is typically fixed in position within the housing 12. The carrier plate 32 of the interior rearview mirror can be used to maintain the position of the reflective element 16 and/or carry the circuit board 38. An example of an interior review mirror including a carrier plate and a circuit board is disclosed in U.S. Pat. No. 6,239,899, entitled MIRROR WITH INTERNAL SUPPORT PLATE, the entire contents of which are hereby incorporated by reference. In the interior rearview mirror, the carrier plate 32 assists in maintaining the reflective element 16 in position within the housing 12. The rear housing section 34, bezel 36, carrier plate 32, circuit board 38 and their interconnections are well known to those skilled in the art (except for any alterations discussed herein). An example of a rear housing section, a bezel, a carrier plate, a printed circuit board and their interconnections with a mount is disclosed in U.S. Patent Application Publication No. 2005/0152054 entitled REFLECTIVE ELEMENT HOLDER FOR REARVIEW MIRROR, the entire contents of which are hereby incorporated herein by reference.

In the illustrated example, the circuit board 38 and the reflective element 16 are located adjacent the carrier plate 32. The carrier plate 32 includes a first face 42 and a second face 44. The circuit board 38 is located adjacent the second face 44 of the carrier plate 32. The circuit board 38 includes a first side 46 facing the carrier plate 32 and a second side 48 facing away from the carrier plate 32. The reflective element 16 is located adjacent the first face 42 of the carrier plate 32.

The illustrated reflective element 16 of the present invention can comprise an electrochromic (EC) mirror subassembly having a front glass element 100 and a rear glass element 102. The illustrated front glass element 100 and the rear glass element 102 are preferably less than 2.2 mm, or more preferably less than about 1.6 mm down to about 1.1 mm. A more detailed description of reflective elements 16 having glass elements of a thickness of 1.1 mm is disclosed in U.S. Pat. No. 6,195,194 entitled LIGHTWEIGHT ELECTROCHROMIC MIRROR, the entire contents of which are hereby incorporated herein by reference. In the illustrated embodiment, the reflective element 16 is in an interior rearview mirror and therefore has a reflectance value of about 70 percent or greater.

The illustrated reflective element 16 includes an electrochromic (EC) material positioned between the front glass element 100 and the rear glass element 102. Furthermore, a reflector material is preferably located on either the front surface or the rear surface of the rear glass element 102, depending upon the type of the mirror subassembly. The EC material is preferably a solution phase (sometimes called herein a "liquid-phase" or "gel-type") EC material, as disclosed in U.S. Pat. No. 4,902,108 entitled SINGLE-COMPARTMENT, SELF-ERASING, SOLUTION-PHASE ELECTROCHROMIC DEVICES, SOLUTIONS FOR USE THEREIN, AND USES THEREOF and U.S. Pat. No. 5,278,693 entitled TINTED SOLUTION-PHASE ELECTROCHROMIC MIRRORS, the entire contents of both of which are hereby incorporated herein by reference. In addition, a hybrid system where part of the electrochromic medium is solid-state and part is solution phase is also contemplated. Solution-phase materials, because of their liquidic or flowable properties, do not rigidly bond the front glass element 100 and the rear glass element 102 together like a completely solid-state EC medium. As a result, the stiffness of the reflective element 16 using 1.1 mm thick glass elements and a solution-phase EC material is more flexible than an EC mirror subassembly having 1.1 mm thick glass elements and a solid-state phase EC material because, in the reflective element 16 having solid-state phase EC material, the thick glass elements are bonded together in a manner that causes them to bend much like a single glass element having their total thickness. Contrastingly, the reflective element 16 with the solution phase EC material bends in a complex manner wherein the thin glass elements bend simultaneously but independently and separately and wherein the solution phase EC material ebbs and flows somewhat in reaction to the stress. The net result is that the mirror subassembly with solution phase EC material tends to be more flexible and concurrently more sensitive to impact than the mirror subassembly with solid-state phase EC material, even where the front and rear glass elements have the same thickness and other properties. Although the reflective element 16 is illustrated as including the EC material, it is contemplated that the reflective element 16 could any type of reflective surface. For example, the reflective element 16 could be a prismatic mirror.

Figure 2:
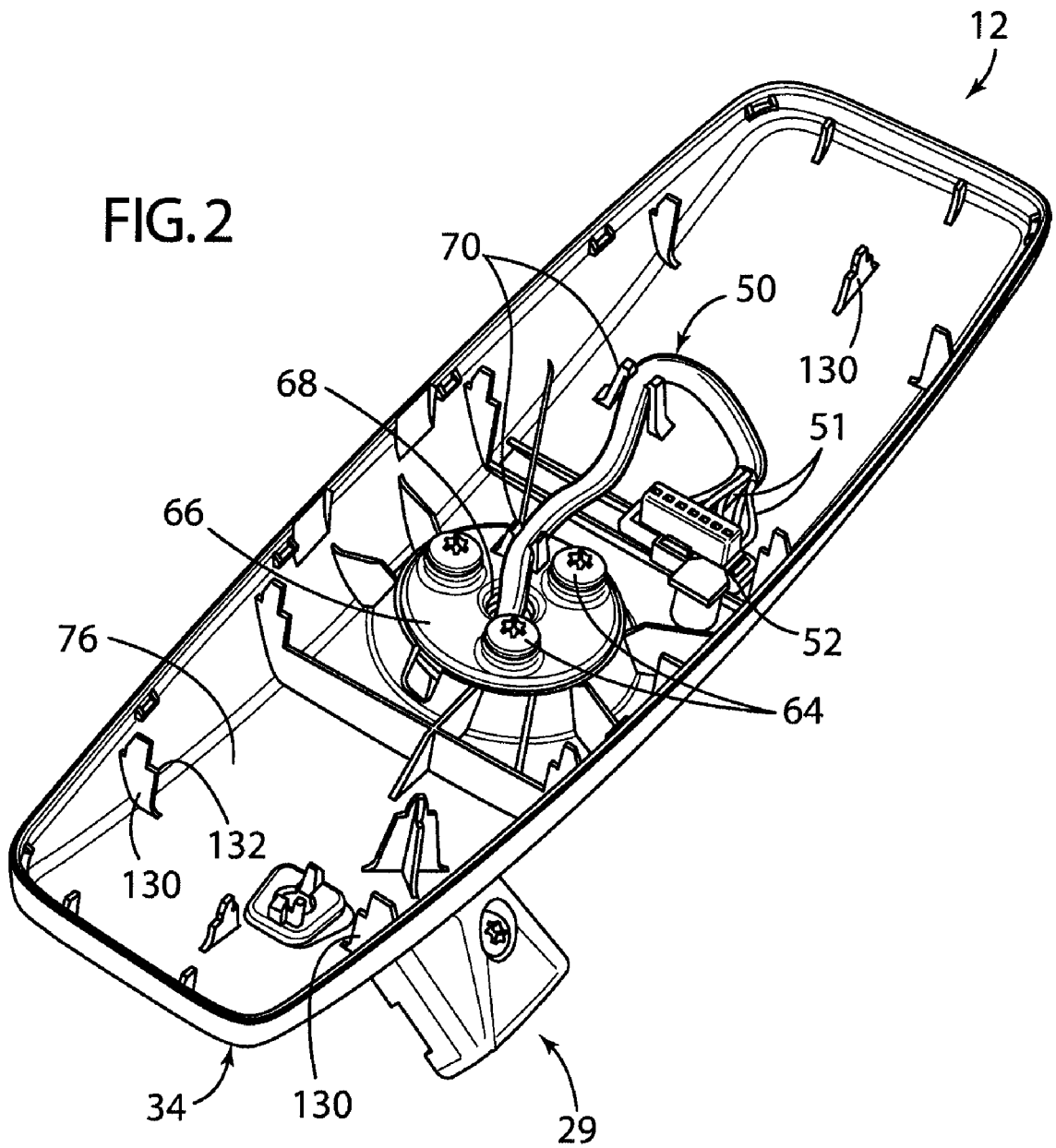
FIG. 2 is a top perspective view of a mounting bracket, rear housing section, wiring and first electrical connection device of the present invention.
Figure 3:
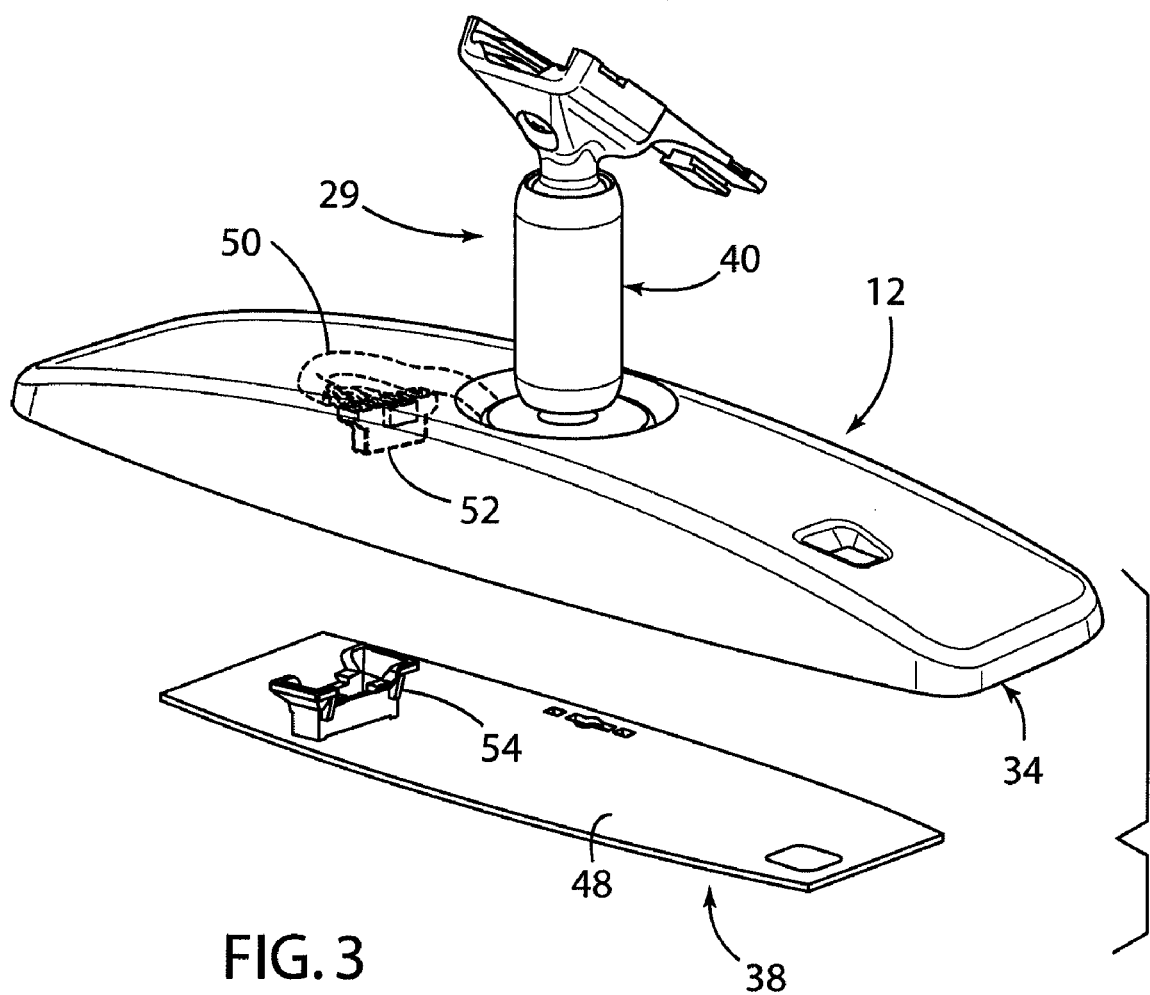
FIG. 3 is a bottom exploded perspective view of the mounting bracket, rear housing section, wiring, first electrical connection device, second electrical connection device and circuit board of the present invention.
Figure 4:
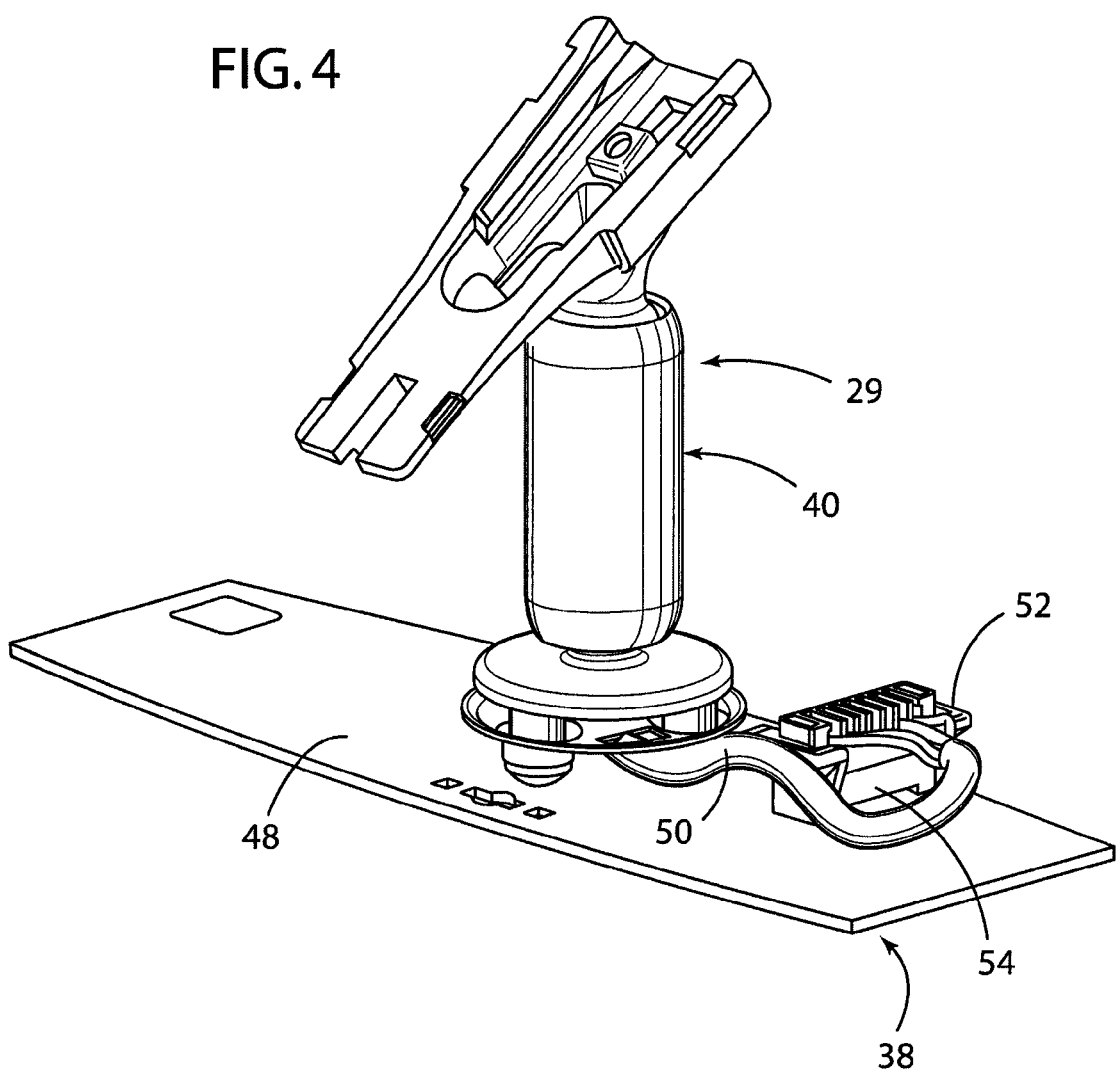
FIG. 4 is a bottom perspective view of the mounting bracket, wiring, first electrical connection device, second electrical connection device and circuit board of the present invention.
Figure 5:
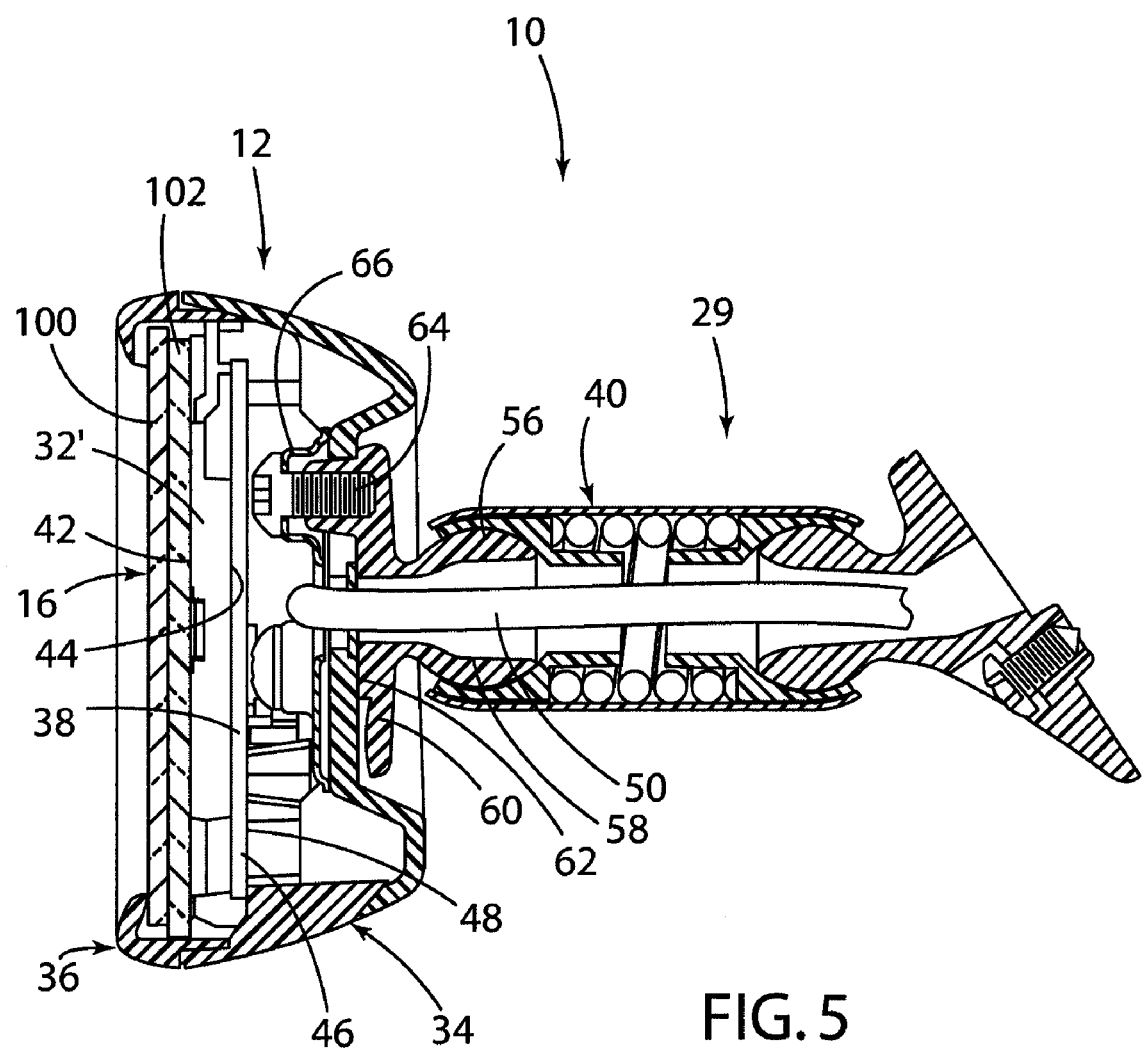
FIG. 5 is a cross-sectional view of the rearview mirror of the present invention.
Figure 6:
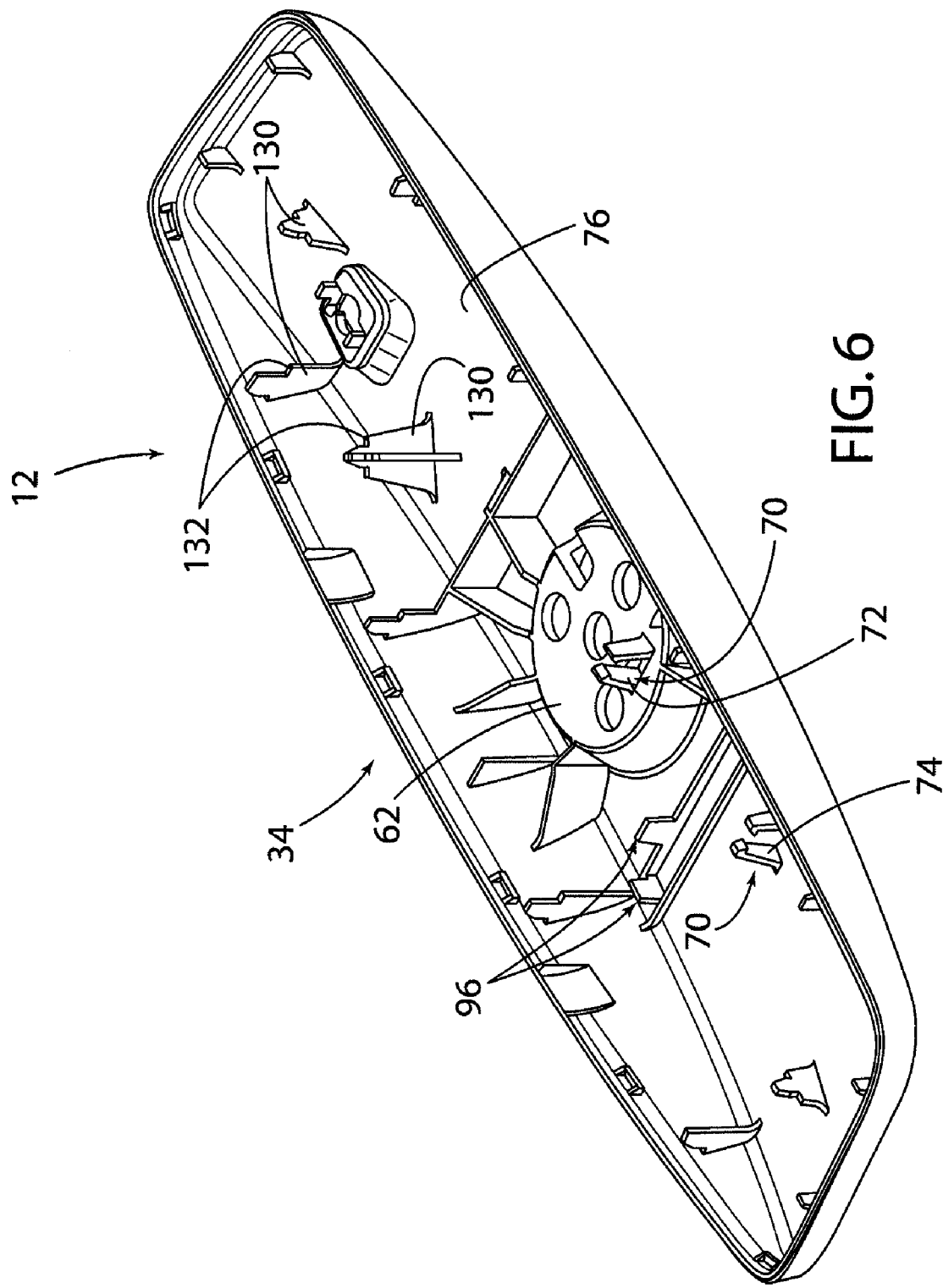
FIG. 6 is a top perspective view of the rear housing section of the present invention.

In the illustrated example, wiring 50 is routed through the mounting bracket 29 and into the housing 12 for supplying and/or receiving power and control to circuits on the circuit board 38. For example, the wiring 50 can be used to power the EC mirror as discussed above or power and/or control and of the electrical components discussed in more detail below. In the illustrated example, the wiring 50 enters the rear housing section 34 through the mounting bracket 29. However, it is contemplated that the wiring 50 could enter the rear housing section 34 through any portion of the rear housing section 34. In the illustrated embodiment, the mounting bracket 39 includes a ball section 56 connected to the rear housing section 34, with the ball section 56 including a center opening 58 having the wiring 50 routed therethrough (see FIG. 5). The ball section 56 includes a mounting plate 60 connected to an outside of a flat portion 62 of the rear housing section 34 by a plurality of screws 64. The plurality of screws 64 are also connected to a mounting washer 66 on an inside of the flat portion 62 of the rear housing section 34, thereby connecting the ball section 56 and the mounting bracket 29 to the housing 12. As illustrated in FIGS. 2 and 5, the wiring 50 extending through the ball section 56, through an opening in the flat portion 62 of the rear housing section 34, and through a center opening 68 in the mounting washer 66. The wiring 50 can comprise a plurality of wires 51 within an outer sheath (as shown) and/or at least one wire 51. As illustrated in FIGS. 2 and 6, the rear housing section 34 can include at least one clip 70 for retaining the wiring 50 in the rear housing section 34. The clips 70 can include a first clip 72 that extends from the flat portion 62 of the rear housing section 34 and through an opening 74 in the mounting washer 66. The clips 70 can also include a second clip 74 extending from an inside surface 76 of the rear housing section 34. The wiring 50 is connected to the first electrical connection device 52.

Figure 11:
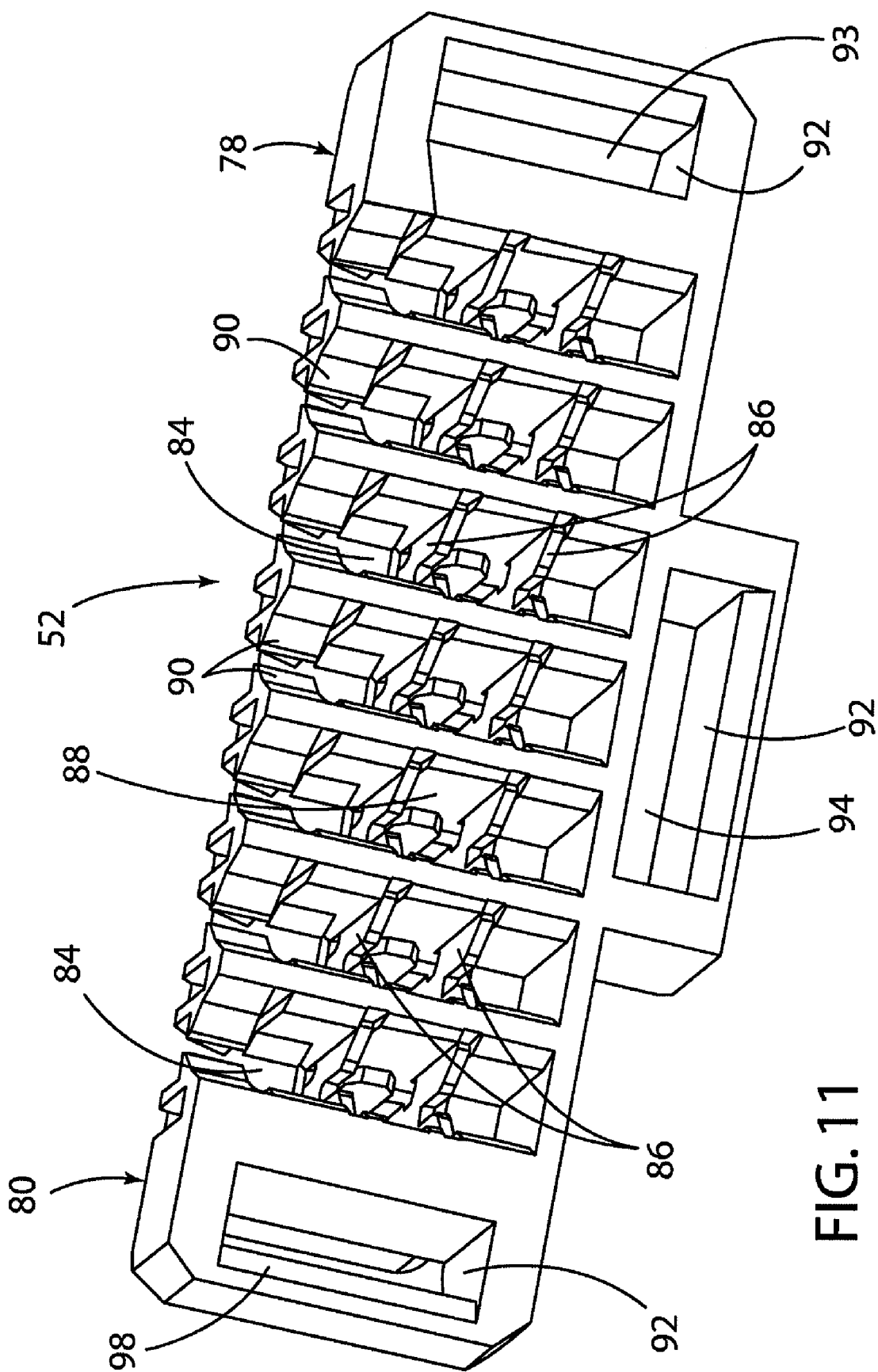
FIG. 11 is a bottom perspective view of the first electrical connection device of the present invention.
Figure 12:
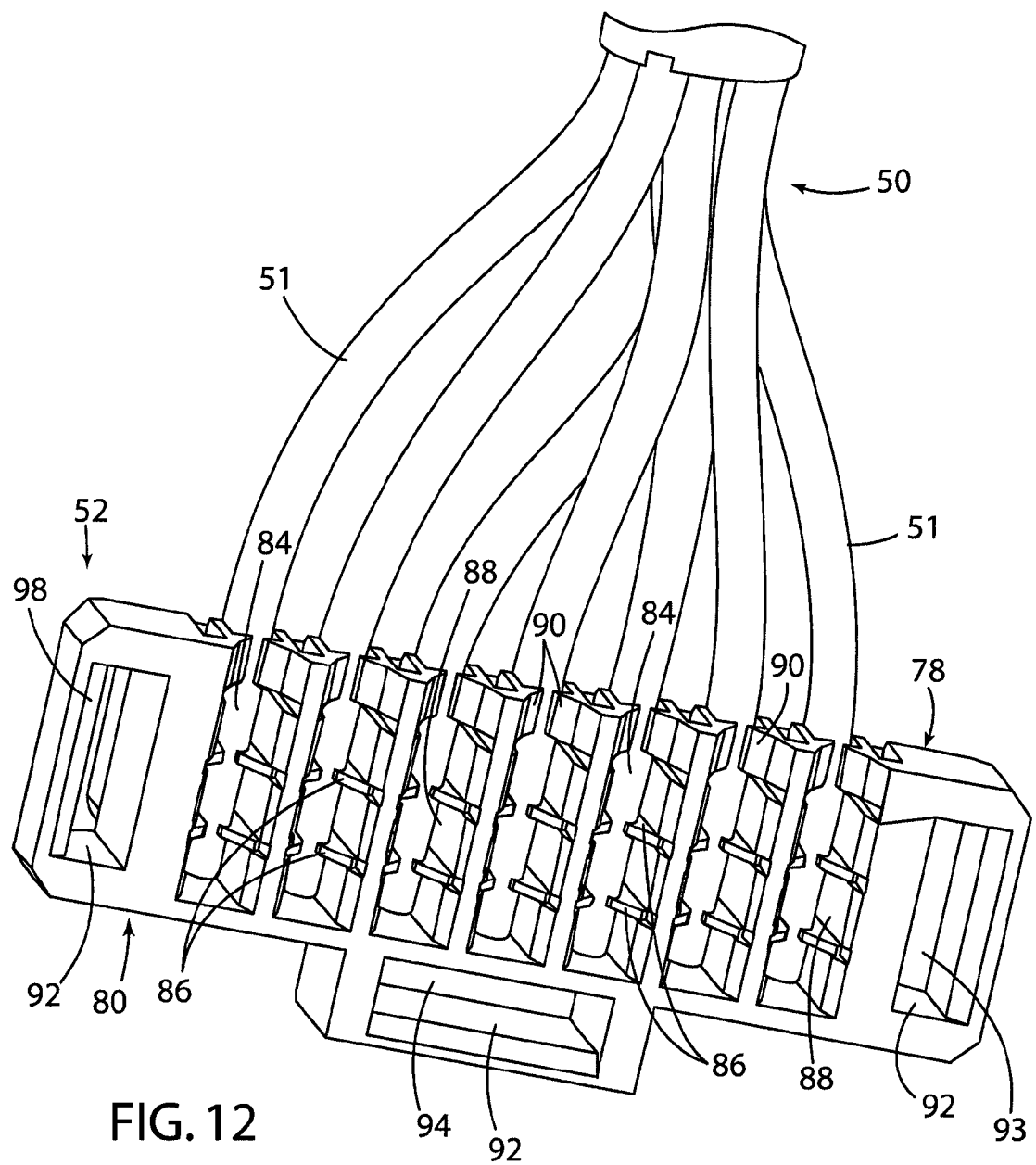
FIG. 12 is a bottom perspective view of the first electrical connection device and wiring of the present invention.
Figure 13:
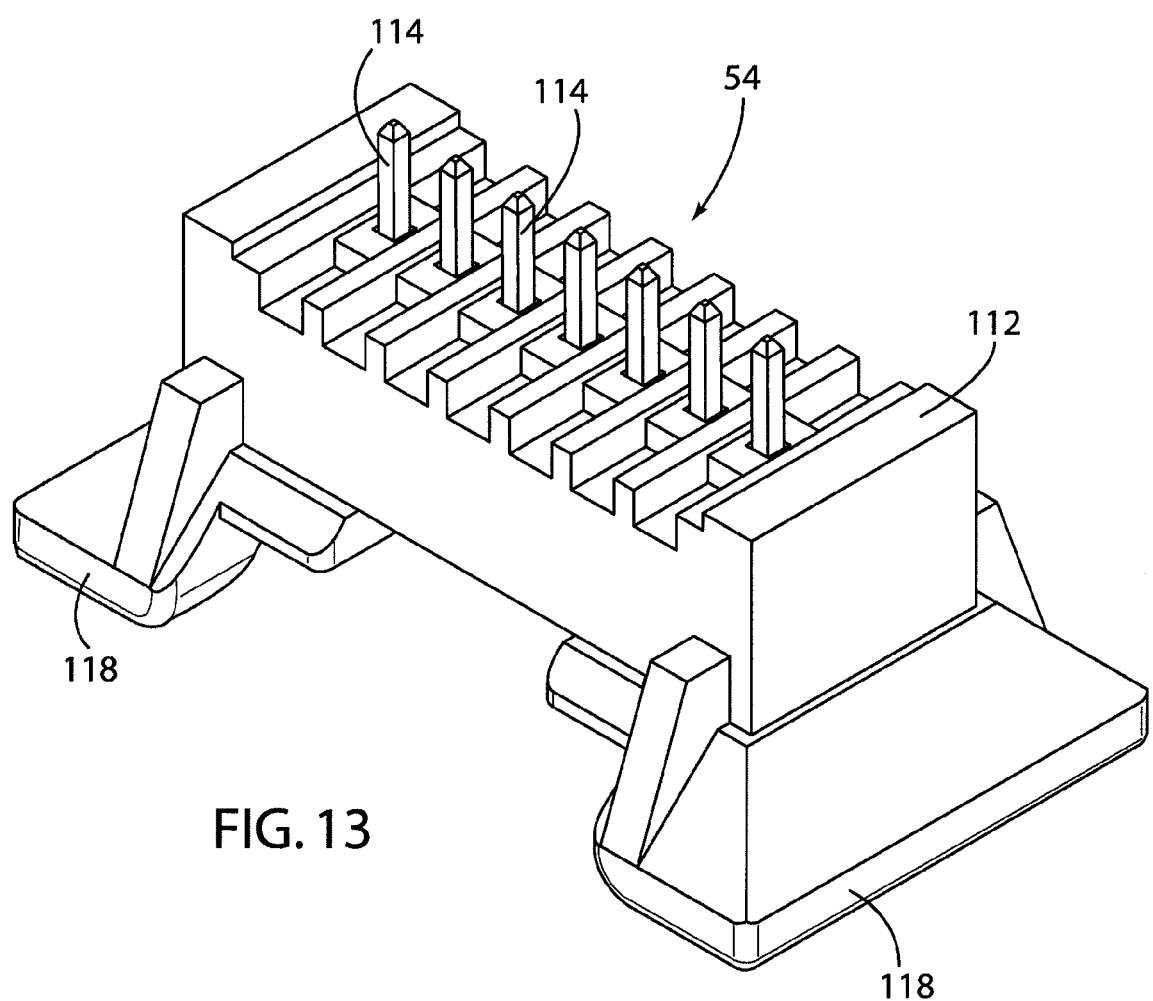
FIG. 13 is a top perspective view of the second electrical connection device of the present invention.

The illustrated first electrical connection device 52 (see FIGS. 9-12) is connected to the rear housing section 34 and is configured to be removably connected to the second electrical connection device 54. The first electrical connection device 52 can be any device for electrically connecting the wiring 50 to the second electrical connection device 54. In the illustrated embodiment, the first electrical connection device 52 comprises a connection block 78 having a first portion 80 for accepting the wiring 50 therein and a second portion 82 for electrical connection to the second electrical connection device 54. The first portion 80 includes a plurality of receptacles 84 for receiving individual wires of the wiring 50. The receptacles 84 can include any mechanism for securing the wires thereto and for supplying and/or receiving power and control to circuits. As illustrated in FIGS. 11 and 12, the receptacles 84 can each include at least one U-shaped knife connector 86. Therefore, the wires 51 can be connected to the first electrical connection device by inserting ends of the wires 51 through a bottom aperture 88, such that the wires 51 are captured by the U-shaped knife connector 86 in the receptacle 84. The U-shaped knife connector 86 allow the wires 51 to be inserted into the receptacles without removing the insulation from the wires 51 as the U-shaped knife connector 86 will cut through the insulation to make an electronic connection between the wires 51 and the U-shaped knife connector 86. Each receptacle 84 can also include a clip 90 for holding the wires 51 within the receptacle 84.

In the illustrated example, the first portion 80 of the connection block 78 also includes at least one slot 92 for connecting the first electrical connection device 52 to the rear housing section 24. In the illustrated example, the first portion 80 includes a first slot 93 located in line with the receptacles 84 and a second slot 94 perpendicular to the first slot 93. As illustrated in FIG. 6, the rear housing section 34 includes at least one peg 96 for insertion into the slots 92 to removably connect the first electrical connection device 52 to the rear housing section 34. It is contemplated that at least one of the pegs 96 could include a tab on a terminal end thereof to snap fit the first electrical connection device 52 to the rear housing section 34 in a stable manner. The first portion 80 can also include a third slot 98 (or more slots) for connection with further pegs 96 extending from the rear housing section 34. However, it is contemplated that the rear housing section 34 could only include one or two pegs 96 for engagement with one or two slots 92 to thereby allow various first electrical connection devices 52 having any number of receptacles 84 to be connected thereto (i.e., since only one or two sides of the first portion 80 with slots are connected to the rear housing section, the first portion 80 can be of any length to accommodate any number of receptacles 84). It is further contemplated that the first portion 80, and thereby the first electrical connection device 52 could be fixedly connected to the rear housing section 34 or removably connected to the rear housing section 34 in any manner (e.g., heat staking, screwing, welding, etc.).

The illustrated second portion 82 of the first electrical connection device 52 is configured to be connected to the second electrical connection device 54. The second portion 82 includes a plurality of openings 110 facing towards the second side 48 of the circuit board 38. Each openings 110 has an electrical connector therein connected to one of the U-shaped knife connectors 86 in the receptacles 84 to allow items being inserted into the openings 110 to be electrically connected to the U-shaped knife connectors 86 in the receptacles 84 and thereby the wires 51.

Figure 8:
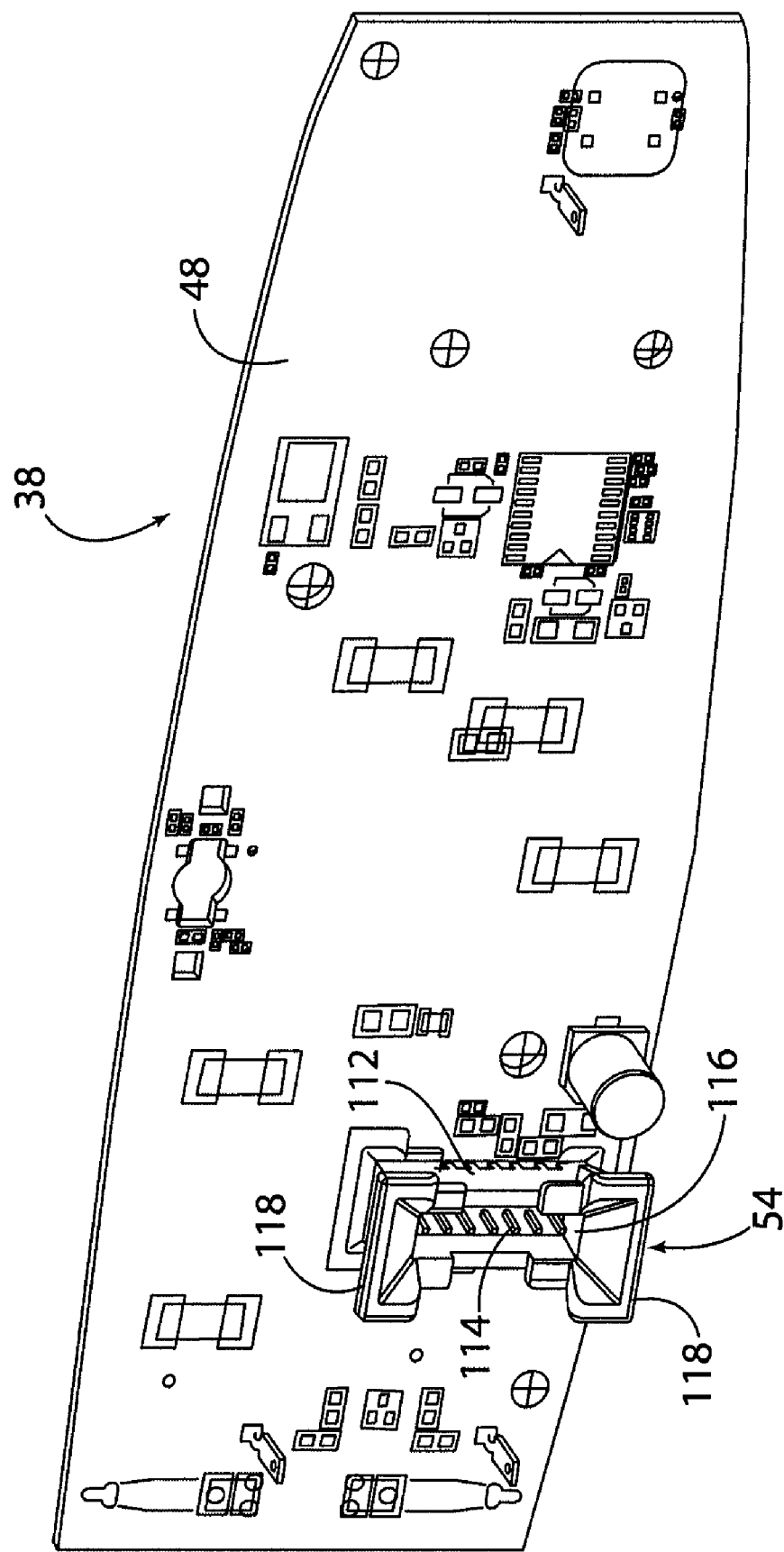
FIG. 8 is a rear perspective view of the second electrical connection device and circuit board of the present invention.
Figure 9:
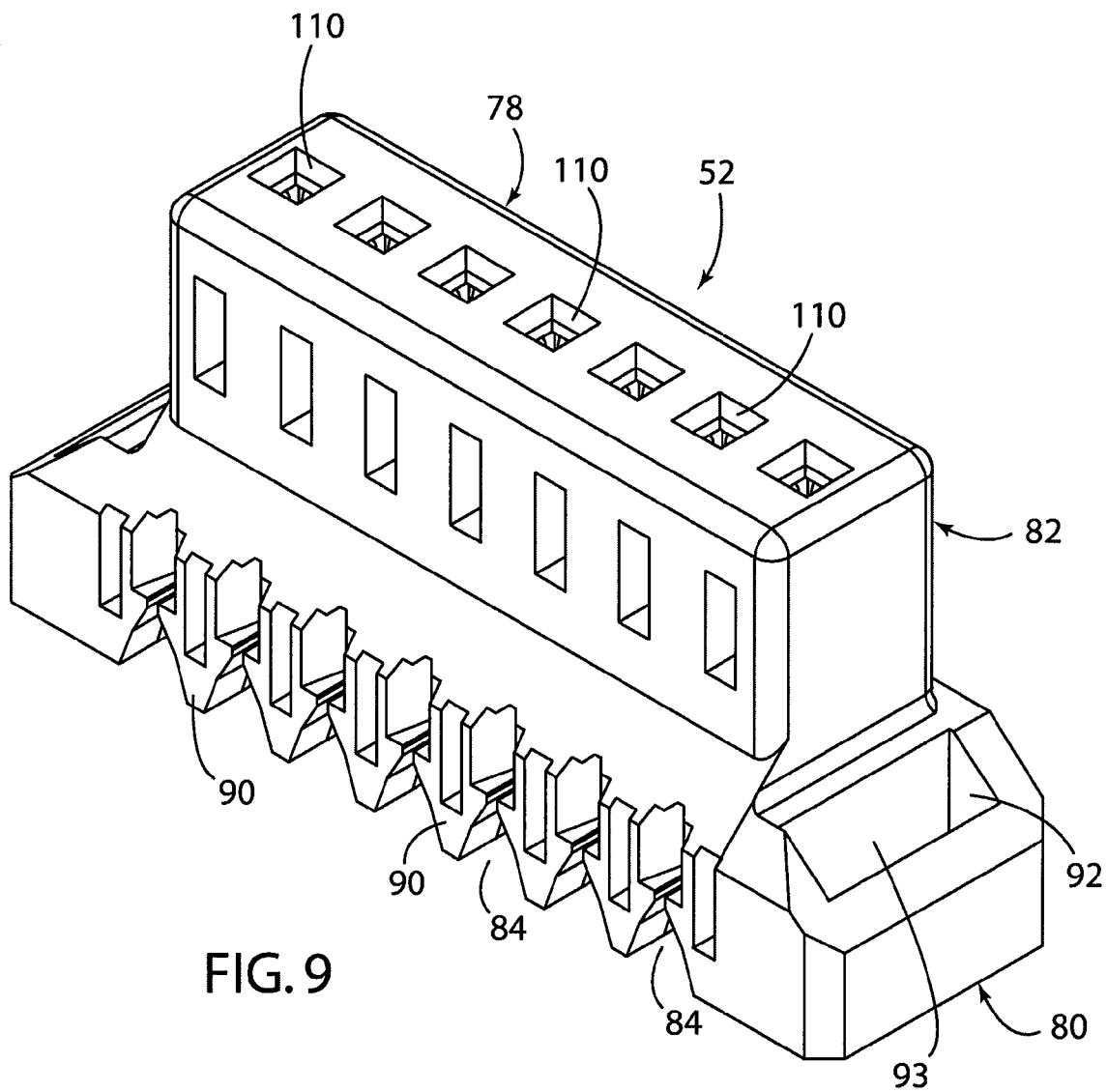
FIG. 9 is a top perspective view of the first electrical connection device of the present invention.
Figure 10:
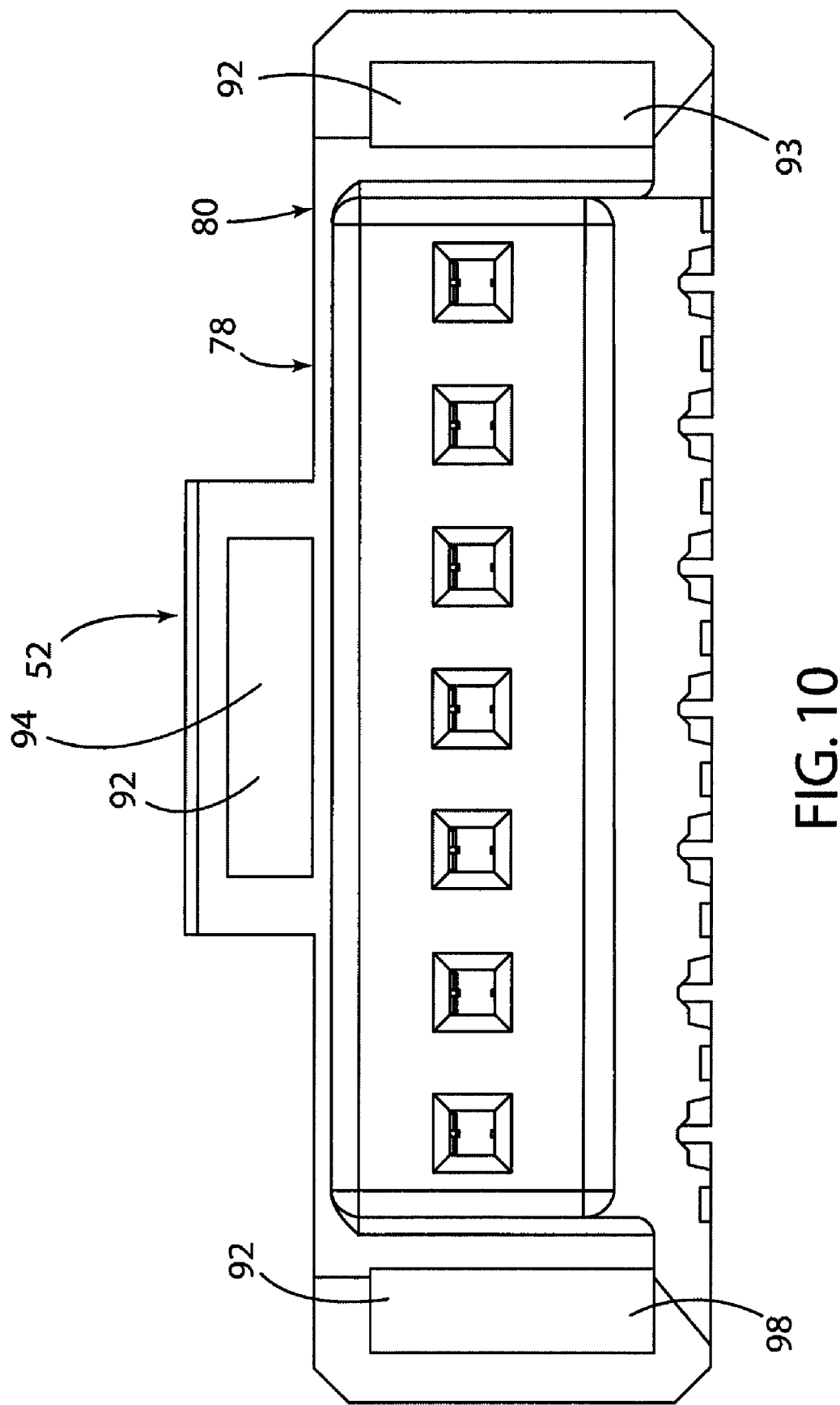
FIG. 10 is a top view of the first electrical connection device of the present invention.
Figure 14:
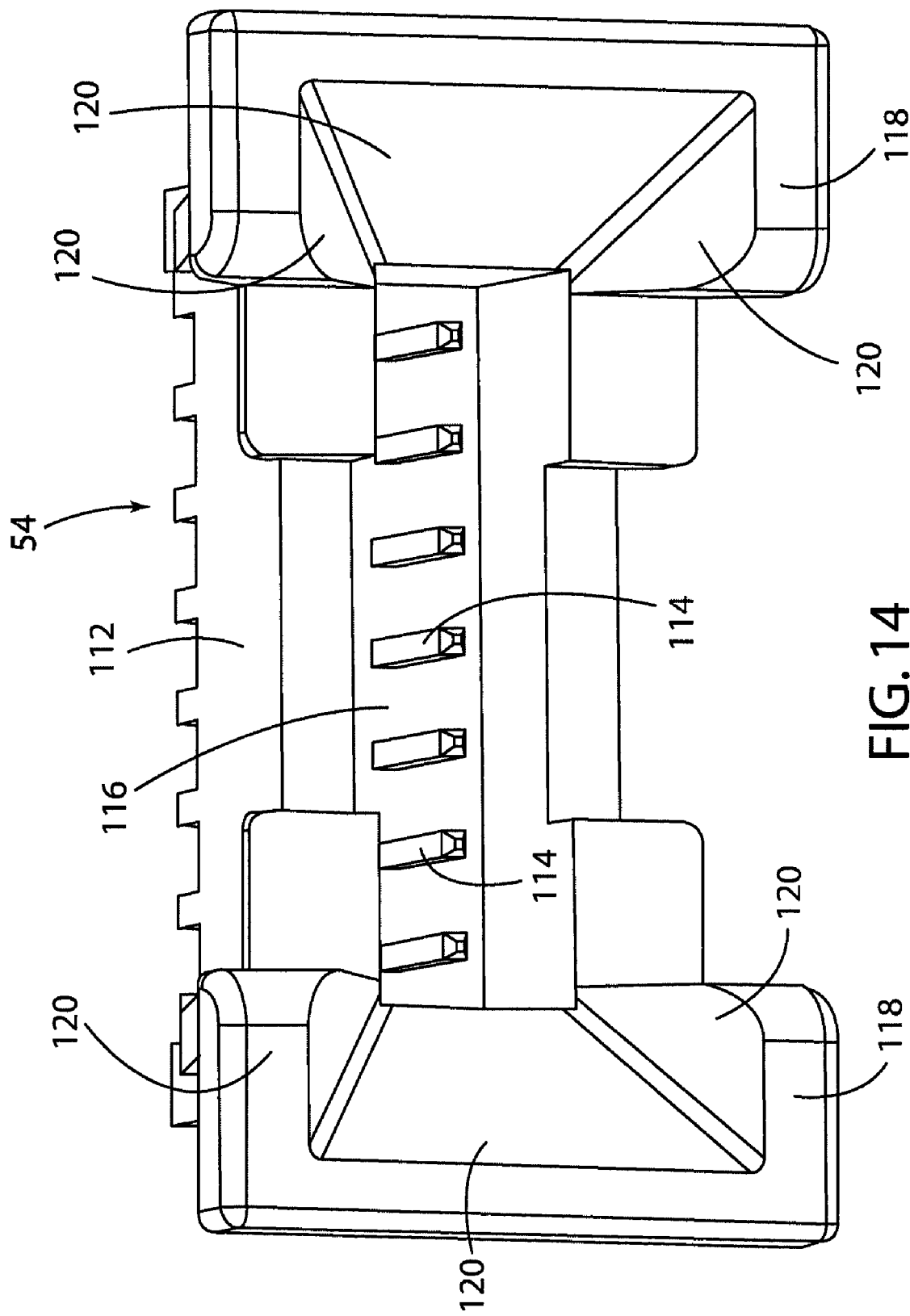
FIG. 14 is a bottom perspective view of the second electrical connection device of the present invention.
Figure 15:
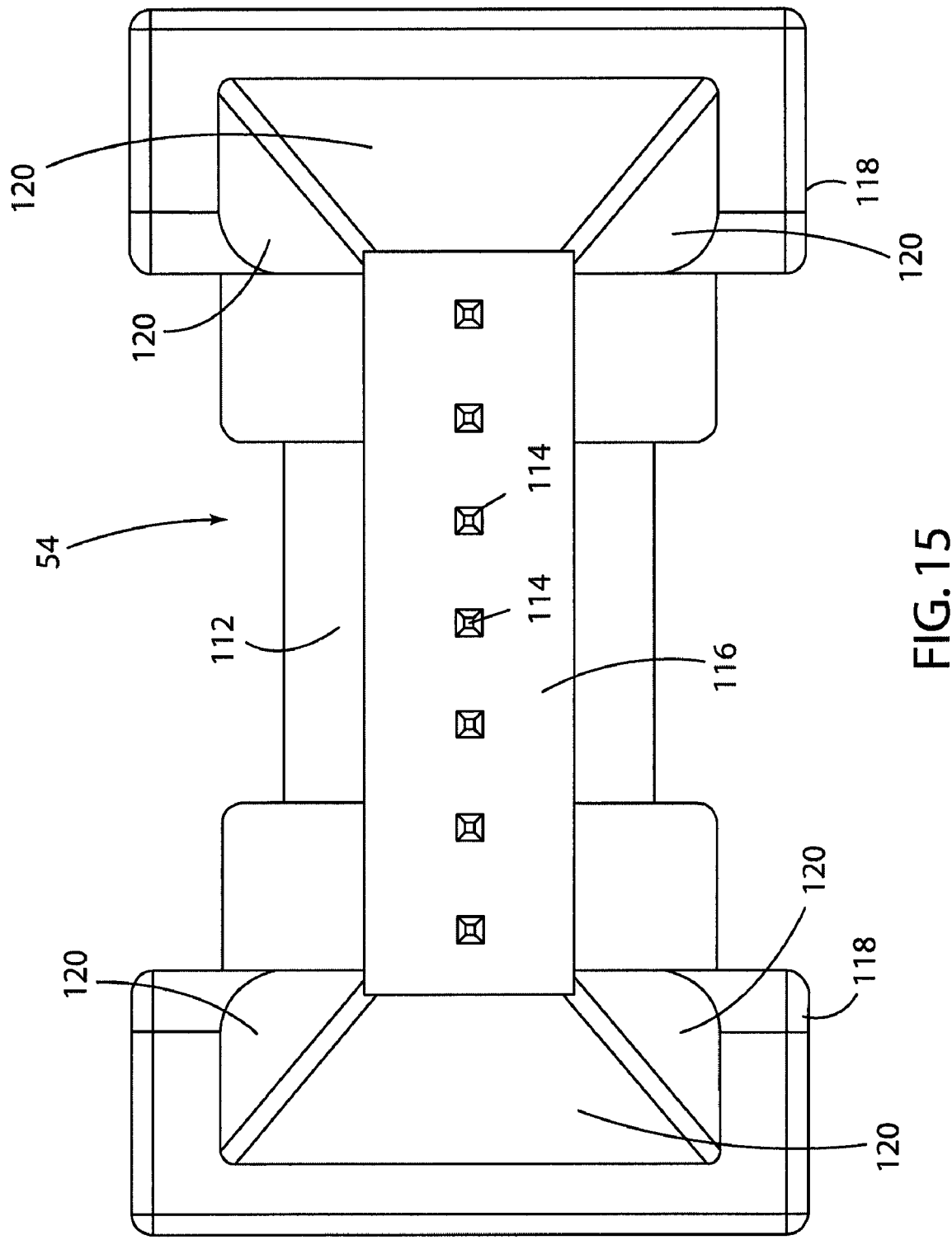
FIG. 15 is a bottom view of the second electrical connection device of the present invention.

In the illustrated embodiment, the second electrical connection device 54 (see FIGS. 8 and 13-15) is connected to the second side 48 of the circuit board 38 and is configured to be connected to the first electrical connection device 52. The second electrical connection device 54 includes a base 112 connected to the circuit board 38. A plurality of prongs 114 extend through the base 112 and into the circuit board 38. The prongs 114 are electrically connected to circuits on the circuit board 38. As illustrated in FIGS. 8, 14 and 15, the base 112 includes a receiving slot 116 facing away from the second side 48 of the circuit board 38. The prongs 114 extend into the receiving slot 116. The base 112 also includes at least one funnel extension 118 surrounding the receiving slot 116. The funnel extension 118 includes at least one funnel surface 120 slanted towards the receiving slot 116. In the illustrated embodiment, the base 112 includes a pair of funnel extensions 118. However, it is contemplated that the base 112 could include any number of funnel extensions 118 (including only one).

The illustrated first electrical connection device 54 is configured to be connected to the first electrical connection device 52 by inserting the second portion 82 of the first electrical connection device 52 into the receiving slot 116 in the base 112 of the second electrical connection device 54. The funnel extensions 118 assist in funneling the second portion 82 of the first electrical connection device 52 into the receiving slot 116 in the base 112 of the second electrical connection device 54 by having the second portion 82 of the first electrical connection device 52 ride along at least one of the funnel surfaces 120 of at least one funnel extension 118. Once the second portion 82 of the first electrical connection device 52 is fully inserted into the receiving slot 116 in the base 112 of the second electrical connection device 54, the prongs 114 will extend into the openings 110 to thereby create at least one circuit between the wires 51 and the circuit board 38.

Figure 7:
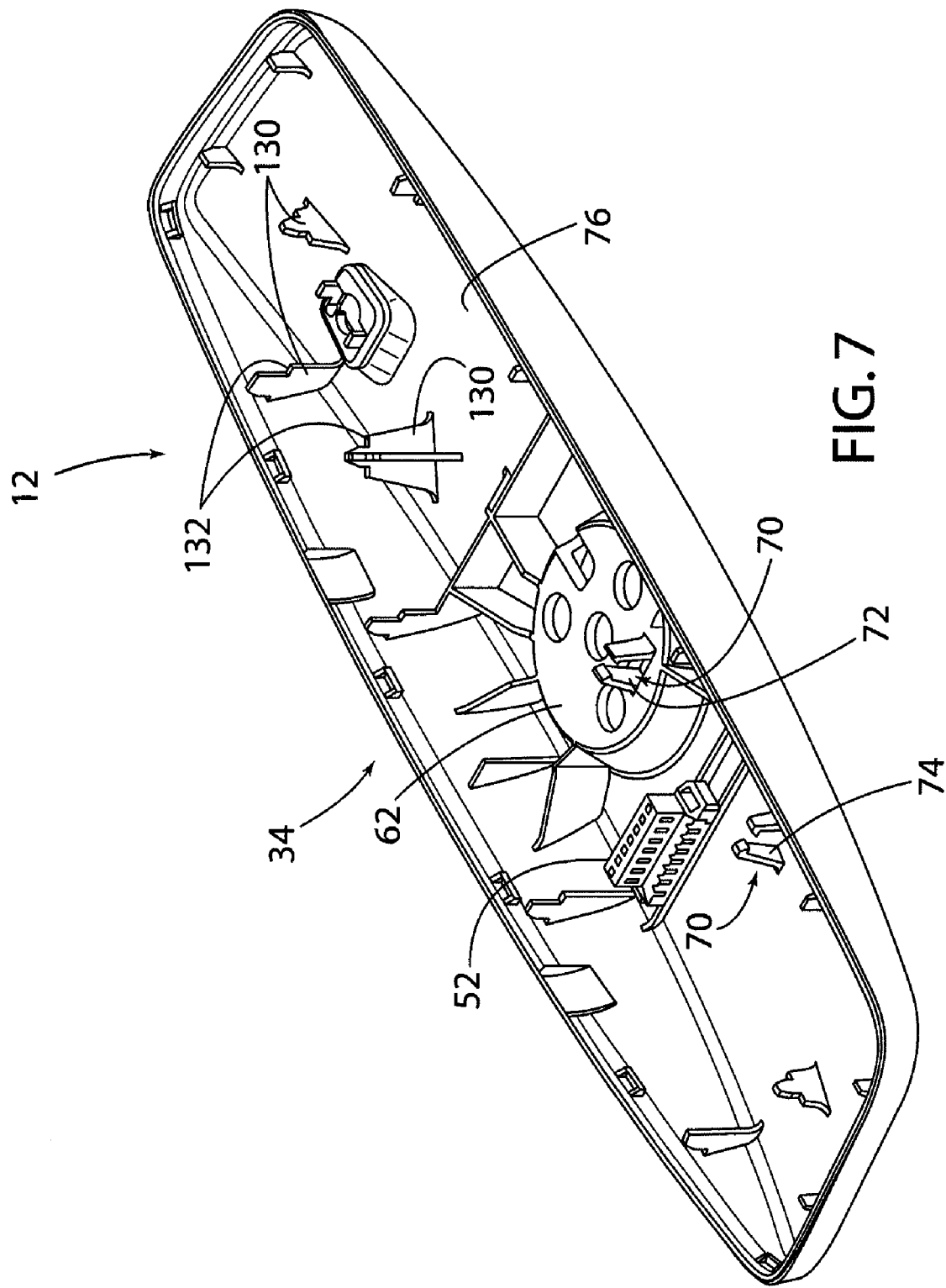
FIG. 7 is a top perspective view of the first electrical connection device and rear housing section of the present invention.

In the illustrated example, the second portion 82 of the first electrical connection device 52 will automatically be received within the receiving slot 116 in the base 112 of the second electrical connection device 54 as the circuit board 38 is moved towards the rear housing section 34. As illustrated in FIGS. 2, 6 and 7, the inside surface 76 of the rear housing section 34 includes a plurality of guide posts 130 extending therefrom. The guide posts 130 include ledges 132 for accepting the circuit board 38 thereon. The inside surface 76 of the rear housing section 34 includes a number of the guide posts 130 to allow the circuit board 38 to be correctly positioned relative to the rear housing section 34. Therefore, as the circuit board 38 is moved relatively towards the rear housing section 34, the guide posts 130 will move the circuit board 38 into position within the rear housing section 34 and simultaneously position the receiving slot 116 in the base 112 of the second electrical connection device 54 such that is will automatically receive the second portion 82 of the first electrical connection device 52. Consequently, the rearview mirror assembly 10 can be constructed by routing the wiring 50 through the rear housing section 34, connecting the wiring 50 to the first electrical connection device 52, positioning the first electrical connection device 52 within the rear housing section 34, moving the circuit board 38 (and optionally the carrier plate 32 and the reflective element 18 at the same time) relatively towards the rear housing section 34 as discussed directly above, and connecting the bezel 36 to the rear housing section 34.

Figure 16:
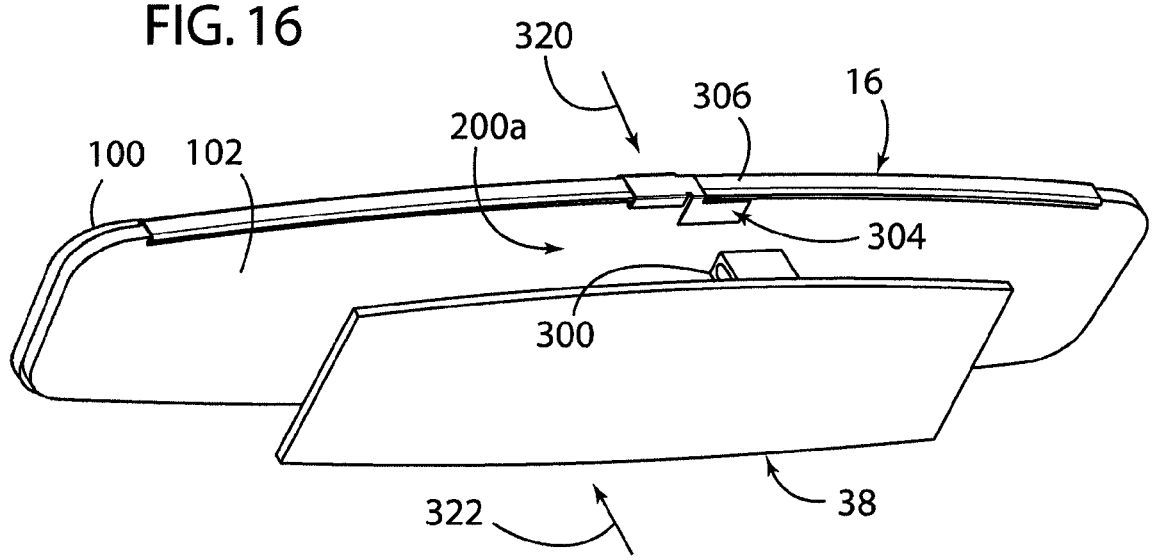
FIG. 16 is a perspective view of a circuit board and a reflective element illustrating a first engagement assembly between the circuit board and the reflective element of the present invention.

As illustrated in FIG. 16, it is further contemplated that the circuit board 38 and the reflective element 16 could have an electrically connection assembly 200a for automatically mating a third electrical connection device 300 on the circuit board 38 with a fourth electrical connection device 304 on the reflective element 16 when the circuit board 38 and the reflective element 16 are moved relative towards each other as discussed above, thereby providing power to the EC material in the reflective element 16 (if the reflective element 16 includes EC material). Providing power to EC material and the results thereof are described above. Therefore, the rearview mirror assembly 10 can have an electrical connection from the wiring 50, through the first electrical connection device 52, through the second electrical connection device 54, through the circuit board 38, through the third electrical connection device 300 and to the fourth electrical connection device 304 and to the EC material in the reflective element 16. It is noted that although only one third electrical connection device 300 and one fourth electrical connection device 304 are illustrated in FIG. 16, typically two third electrical connection devices 300 and two fourth electrical connection devices 304 would be used. However, it is contemplated that only one or more than two third electrical connection devices 300 and fourth electrical connection devices 304 could be used.

Figure 18:
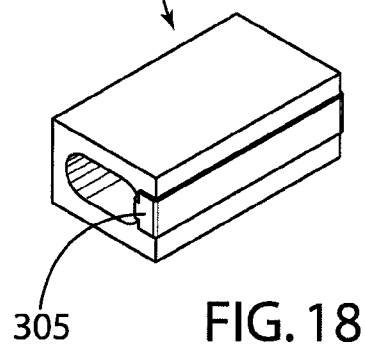
FIG. 18 is a perspective view of a second engagement element of the first engagement assembly of the present invention.

FIGS. 16 and 18 illustrate a first embodiment of the third electrical connection device 300. The third electrical connection device 300 can comprise a compressible conductive pad mounted on the circuit board 38. For example, the compressible conductive pad could comprise a gasket and grounding pad comprised of a conductive silver-coated hollow silicone extrusion bonded to a solderable silver-plated metal support layer such as that sold under the trademark Gore-Shield® by W.L. Gore & Associates, Inc. of Newark, Del. and as disclosed in U.S. Pat. Nos. 6,255,581 B1 and 7,129,421 B2, the entire contents of both of which are hereby incorporated herein by reference. The compressible conductive pad can include a solder member 305 for connecting the compressible conductive pad to the circuit board 38. In the illustrated example, as the circuit board 38 is moved towards the reflective element 16, the third electrical connection device 300 will automatically mate with the fourth electrical connection device 304.

Figure 17:
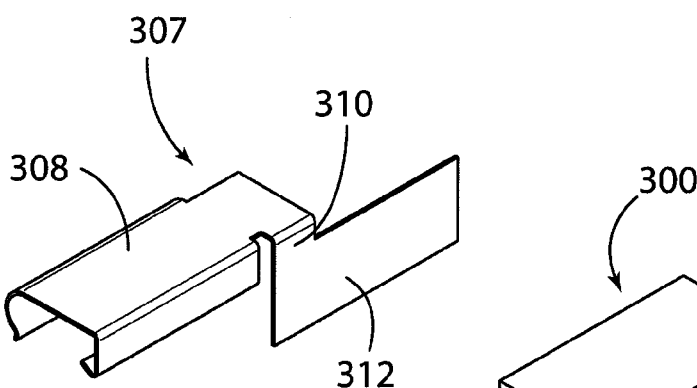
FIG. 17 is a perspective view of a first engagement element of the first engagement assembly of the present invention.

In the illustrated example, a first embodiment of the fourth electrical connection device 304 (FIGS. 16 and 17) comprises a bus clip 306 and a connection clip 307 that connects to the reflective element 16. The connection clip 307 includes a first section 308 configured to clip over an edge of the reflective element 16 (and connect with the bus). The connection clip 307 also includes a second section 312 comprising a plate resiliently connected to the first section 308 via a spring plate 310. The spring plate 310 forces the second section 312 outward and away from the reflective element 16.

As illustrated in FIG. 16, as the reflective element 16 is moved along line 320 and the circuit board 38 is moved along line 322 (or only the reflective element 16 is moved along line 320 or only the circuit board 38 is moved along line 322), the third electrical connection device 300 will automatically mate with the fourth electrical connection device 304 by having the second section 312 of the connection clip 307 of the fourth electrical connection device 304 abut an outside surface of the compressible conductive pad of the third electrical connection device 300. It is contemplated that the second section 312 of the connection clip 307 of the fourth electrical connection device 304 can include a conductive finish to assist in the connection. It is further contemplated that the connection clip 307 may be entirely omitted, such that the fourth electrical connection device 304 comprises the bus clip 306.

Figure 19:
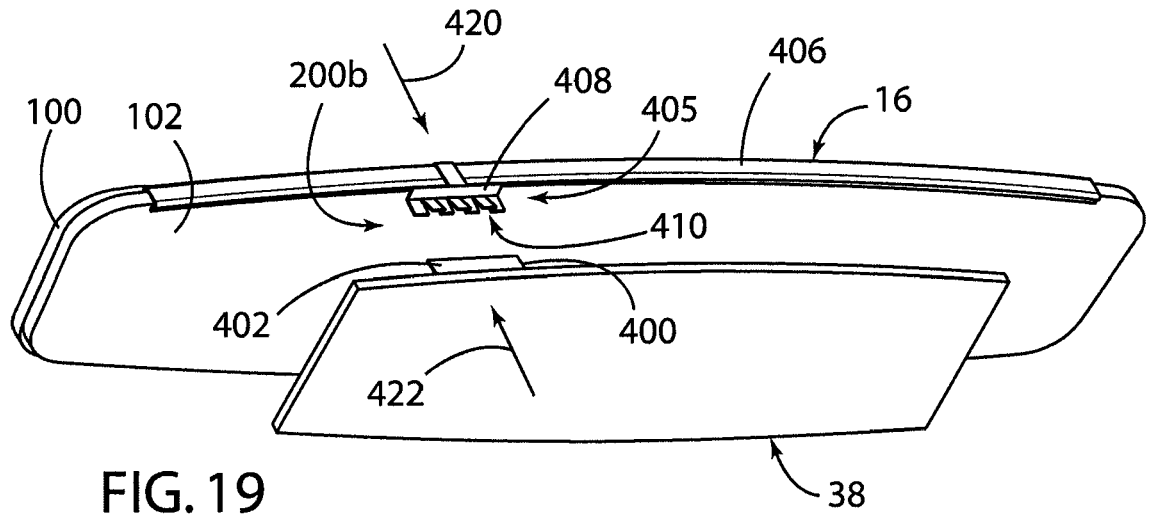
FIG. 19 is a perspective view of a circuit board and a reflective element illustrating a second engagement assembly between the circuit board and the reflective element of the present invention.
Figure 20:
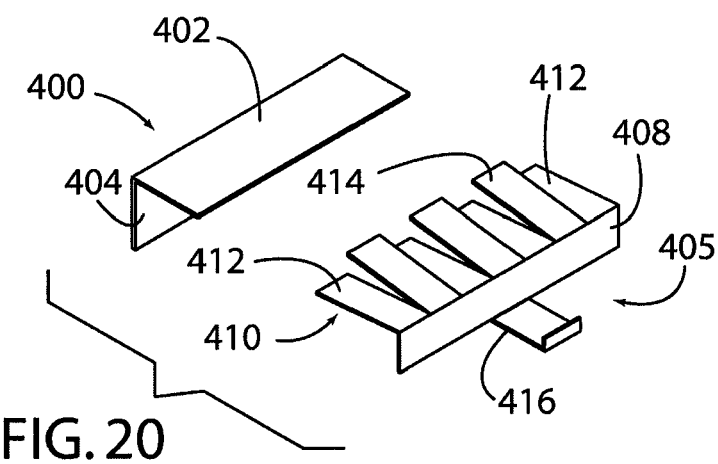
FIG. 20 is an exploded perspective view of the second engagement assembly of the present invention.
Figure 21:
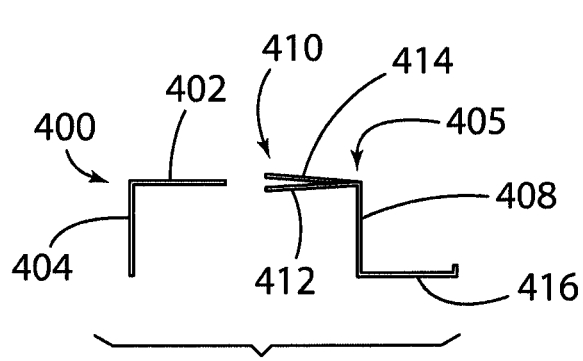
FIG. 21 is an exploded side view of the second engagement assembly of the present invention.

FIGS. 19-21 illustrate a second embodiment of the electrically connection assembly 200b for automatically mating a second embodiment of the third electrical connection device 400 on the circuit board 38 with a second embodiment of the fourth electrical connection device 405 on the reflective element 16 when the circuit board 38 and the reflective element 16 are moved relative towards each other as discussed above, thereby providing power to the EC material in the reflective element 16 (if the reflective element 16 includes EC material). Providing power to EC material and the results thereof are described above. Therefore, the rearview mirror assembly 10 can have an electrical connection from the wiring 50, through the first electrical connection device 52, through the second electrical connection device 54, through the circuit board 38, through the third electrical connection device 400 and to the fourth electrical connection device 405 and to the EC material in the reflective element 16. It is noted that although only one third electrical connection device 400 and one fourth electrical connection device 405 are illustrated in FIG. 19, typically two third electrical connection devices 400 and two fourth electrical connection devices 405 would be used. However, it is contemplated that only one or more than two third electrical connection devices 400 and fourth electrical connection devices 405 could be used.

FIGS. 19-22 illustrate a second embodiment of the third electrical connection device 400. The third electrical connection device 400 can comprise an L-shaped conductor having a first portion 404 connected to the circuit board 38 and a second portion 402 configured to engage a second embodiment of the fourth electrical connection device 405. The second embodiment of the fourth electrical connection device 405 can comprise a first section 416 configured to clip over an edge of the reflective element 16 (and connect with the bus), a second section 408 substantially perpendicular to the first section 416 (and substantially aligned with a rear face of the reflective element 16) and a third section 410 substantially perpendicular to the second section 408. The third section 410 of the second embodiment of the fourth electrical connection device 405 includes a plurality of first downwardly angled fingers 412 and a plurality of second upwardly angled fingers 414.

Figure 22:
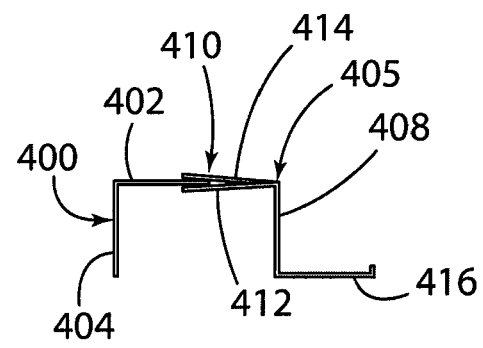
FIG. 22 is a side view of the second engagement assembly of the present invention.

As illustrated in FIGS. 19-22, as the reflective element 16 is moved along line 420 and the circuit board 38 is moved along line 422 (or only the reflective element 16 is moved along line 420 or only the circuit board 38 is moved along line 422), the second embodiment of third electrical connection device 400 will automatically mate with the second embodiment of the fourth electrical connection device 405 by having the second portion 402 of the L-shaped conductor of the second embodiment of third electrical connection device 400 mate with the third section 410 of the second embodiment of the fourth electrical connection device 405. The second portion 402 of the L-shaped conductor of the second embodiment of third electrical connection device 400 mates with the third section 410 of the second embodiment of the fourth electrical connection device 405 by inserting the second portion 402 between the plurality of first downwardly angled fingers 412 and the plurality of second upwardly angled fingers 414 as illustrated in FIG. 22. It is contemplated that the second embodiment of third electrical connection device 400 and the second embodiment of the fourth electrical connection device 405 can include conductive finishes to assist in the connection.

It is noted that the first and second embodiments of the third electrical connection device and the fourth electrical connection device described above are believed to provide a low impedance DC and RF electrical connection between the circuit board 38 and the reflective element 16 that prevents the reflective element 16 from becoming a passive antenna.

It is contemplated that the present inventive concepts can be used in combination with mirrors (interior and/or exterior) having many different options to create synergistic and non-obvious combinations that provide surprising and unexpected benefits not previously possible. Therefore, it will be appreciated by those skilled in the art that various other vehicle accessories and components may be incorporated in the previously described rearview mirror assembly 10 for a vehicle in whole or in part and in various combinations. Such vehicle accessories and components may be mounted within, on or to the housing 12, the mounting bracket 29, attachment to the mirror housing 12 or the mounting bracket 29, or in a console or other housing associated with the interior rearview mirror having the rearview mirror assembly 10 of the present invention. Additionally, any such vehicle accessories may share components with one another, such as processors, sensors, power supplies, wire harnesses and plugs, displays, switches, antennae, etc. Examples of other vehicle accessories, components or features are described further below.

Figure 23B:
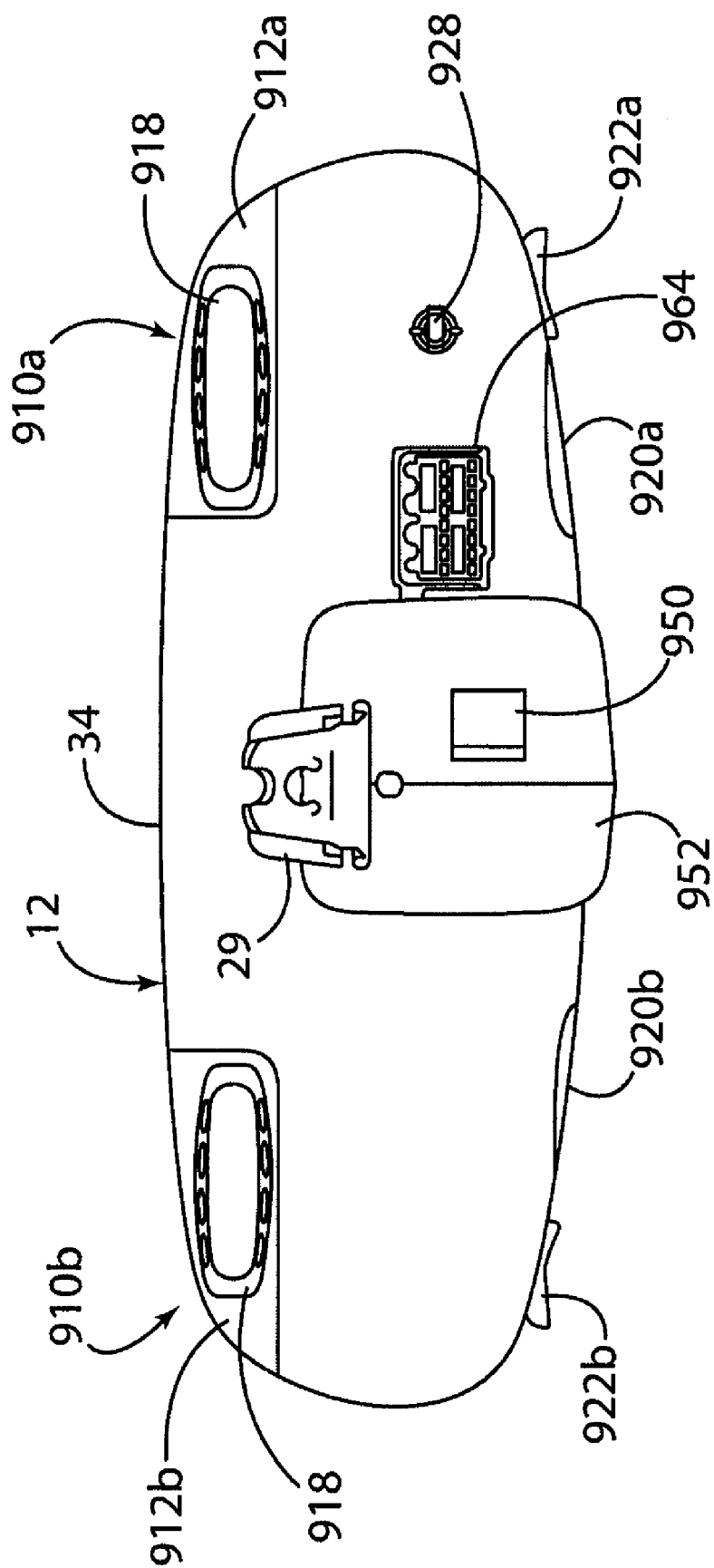
FIG. 23B is an elevational view of the rear of the interior rearview mirror system constructed according to the present invention.
Figure 23C:
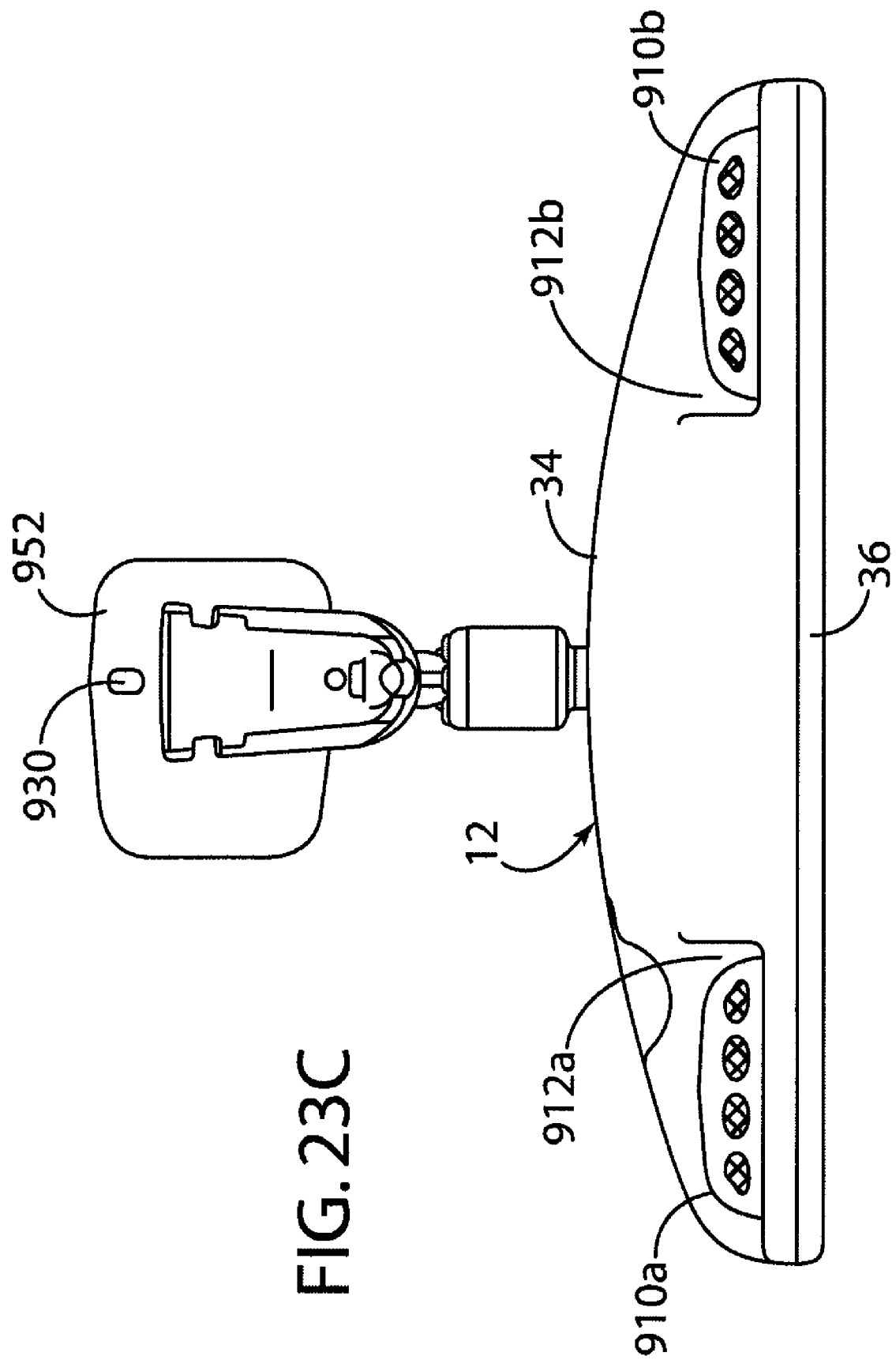
FIG. 23C is a plan view of the top of the interior rearview mirror system constructed according to the present invention.

An example of a system incorporated in the interior rearview mirror includes an electronic compass system within the housing 12 of the interior rearview mirror as described in U.S. Pat. No. 7,149,627 entitled ELECTRONIC COMPASS SYSTEM, the entire contents of which are incorporated in its entirety herein by reference. FIGS. 22A-22C show another embodiment of the interior rearview mirror in which any of the electronic compass systems described in U.S. Pat. No. 7,149,627 are incorporated. As illustrated in FIGS. 23A-23C, the housing 12 comprises the bezel 36 and the rear housing section 34. The bezel 36 and the rear housing section 34 combine to define the housing 12 for incorporation of features in addition to a reflective element 16 and information displays 905a and 905b. Commonly assigned U.S. Pat. Nos. 6,102,546, D410,607, 6,407,468, 6,420,800, and 6,471,362, the disclosures of which are incorporated in their entireties herein by reference, describe examples of various bezels, cases and associated button constructions that may be used with the present invention.

As depicted in FIGS. 23A-23C, the interior rearview mirror may comprise first and second microphones 910a and 910b. Examples of microphones for use with the present invention are described in commonly assigned U.S. Pat. Nos. 7,120,261 and 6,614,911, U.S. Patent Application Publication No. US 2002/0110256 A1, and PCT Application Publication No. WO/2003/041285 A1, the disclosures of which are incorporated in their entireties herein by reference. Although the two microphones are shown as being mounted to the backside of rear housing section 34, one or more such microphones may be mounted on the top of the interior rearview mirror (as shown in FIGS. 23A and 23B), on the bottom of the interior rearview mirror, or anywhere within the rear housing section 34 or bezel 36. Preferably, two microphones 910a and 910b are incorporated, one near each end, into the interior rearview mirror on the backside of the rear housing section 34 within recessed portions 912a and 912b. As shown in FIG. 23A, the microphones are constructed with acoustic dam 914 extending around transducer 916 within microphone housing 918. Additional details of this preferred construction are disclosed in commonly assigned International PCT Application Publication No. WO/2003/041285 A1. The audio systems including the microphones may be integrated, at least in part, in a common control with information displays and/or may share components with the information displays. In addition, the status of these systems and/or the devices controlled thereby may be displayed on the associated information displays.

Figure 24A:
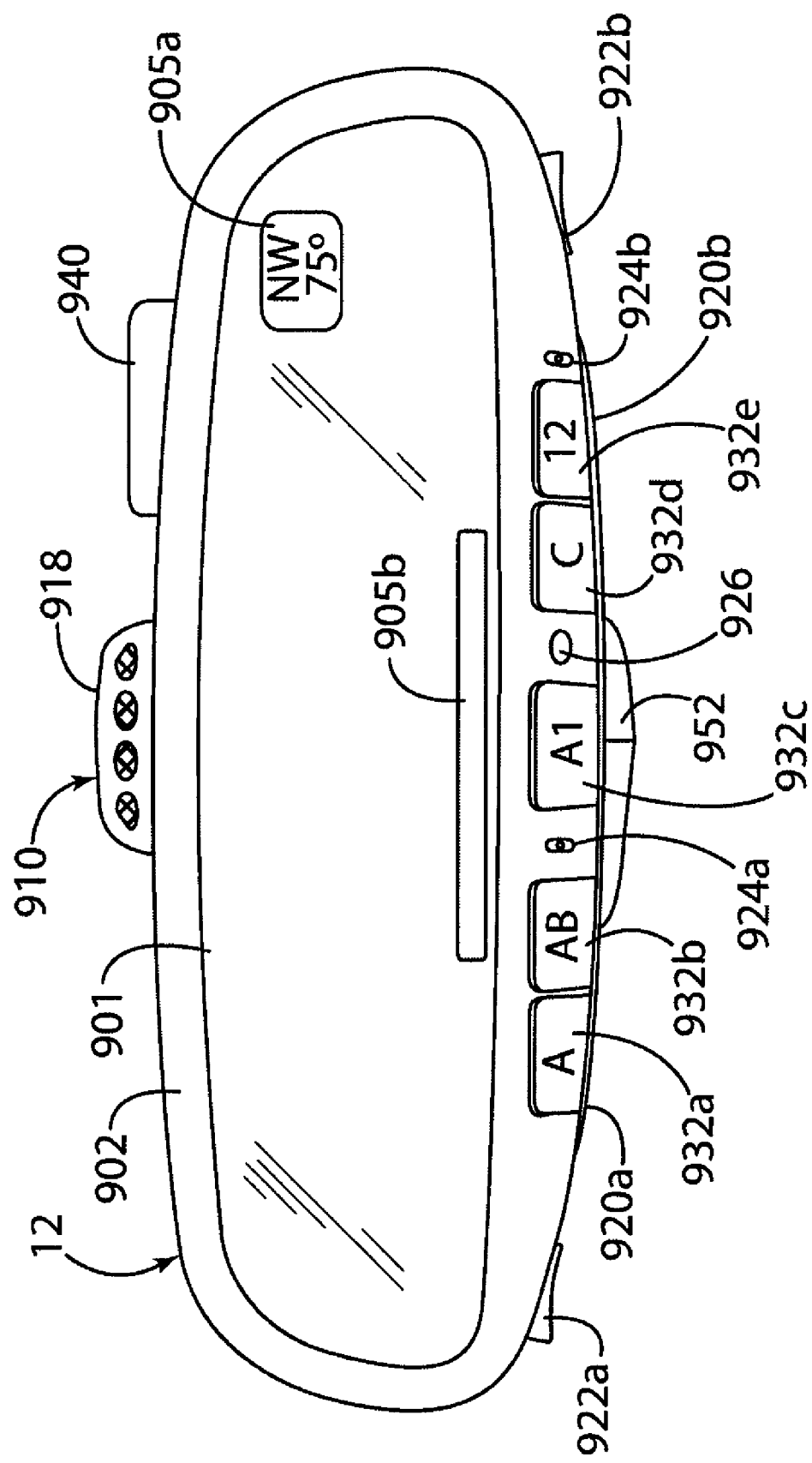
FIG. 24A is an elevational view of the front of the interior rearview mirror system constructed according to the present invention.
Figure 24B:
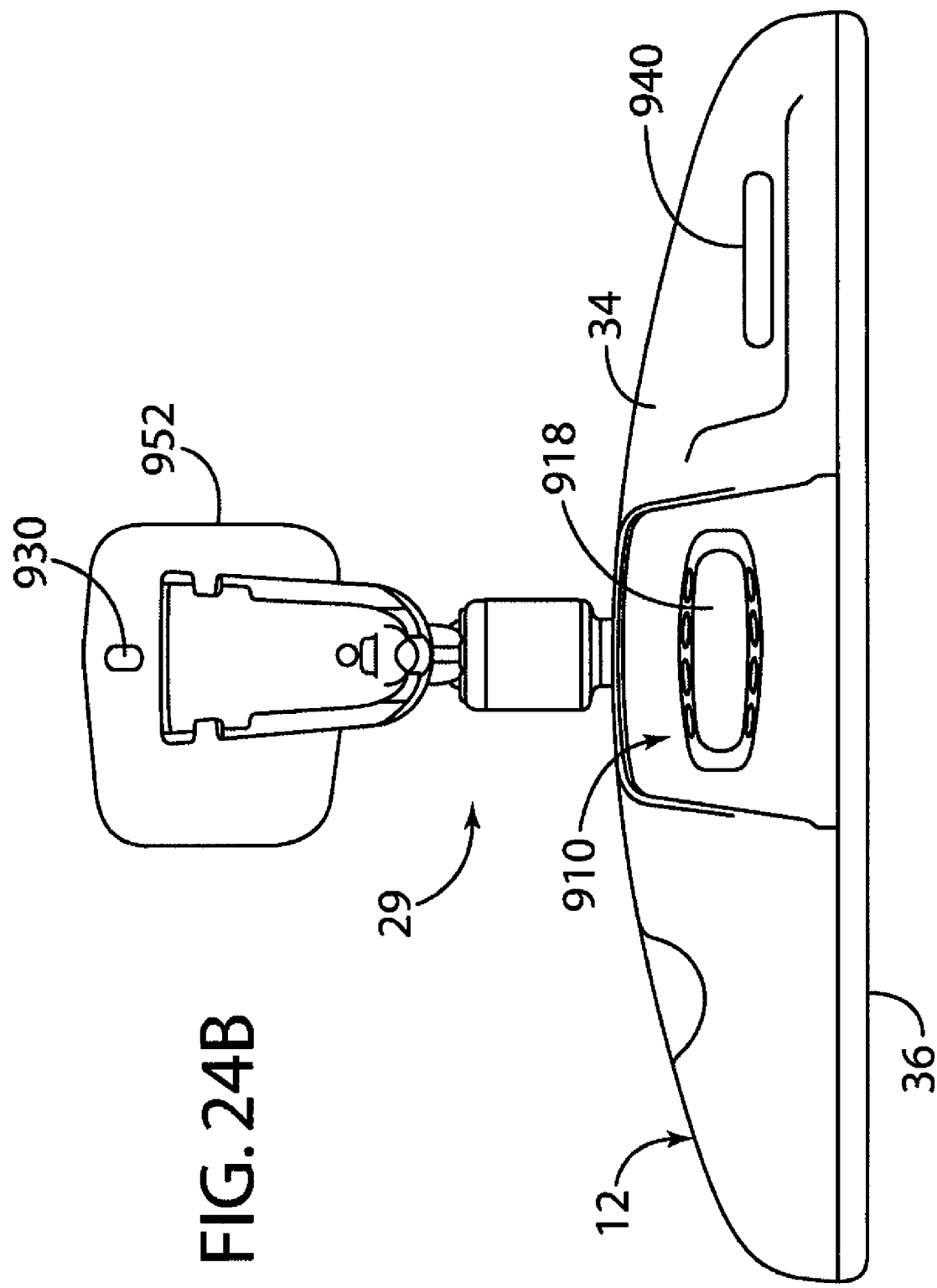
FIG. 24B is a plan view of the top of the interior rearview mirror system constructed according to the present invention.

As shown in FIGS. 24A and 24B, a single microphone 910 is provided on the top side of the housing 12. In this construction, it is preferable to include two transducers in microphone housing 918 in a manner similar to that disclosed in the above-referenced International PCT Application Publication No. WO/2003/041285 A1 and U.S. Patent Application Publication No. US 2002/0110256 A1.

The interior rearview mirror may also include first and second switches 922a and 922b. Suitable switches for use with the present invention are described in detail in commonly assigned U.S. Pat. Nos. 6,407,468, 6,420,800, 6,426,568, and 6,471,362, as well as commonly assigned U.S. Patent Application Publication No. US 2002/0024713 A1, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, adaptive cruise control system, etc. Any other display or system described herein or within the references incorporated by reference may be incorporated in any location within the associated vehicle and may be controlled using the switches.

The interior rearview mirror may also include first and second indicators 924a and 924b. Various indicators for use with the present invention are described in commonly assigned U.S. Pat. Nos. 5,803,579, 6,335,548, 6,441,943, 6,521,916, 6,523,976, 6,670,207, and 6,805,474 as well as commonly assigned U.S. Patent Application Publication No. US 2004/0239243 A1, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

The interior rearview mirror may further include first and second light sensors 926 and 928 serving as glare and ambient sensors, respectively. Preferred light sensors for use within the present invention are described in detail in commonly assigned U.S. Pat. Nos. 5,923,027, 6,313,457, 6,359,274, 6,379,013, 6,402,328, and 6,831,268, and U.S. Patent Application Publication No. US 2002/0056806 A1, the disclosures of which are incorporated in their entireties herein by reference. The glare sensor 926 and/or ambient sensor 928 automatically control the reflectivity of a self dimming reflective element as well as the intensity of information displays and/or backlighting. The glare sensor 926 may also be used to sense headlights of trailing vehicles and the ambient sensor is used to detect the ambient lighting conditions that the system is operating within. In another embodiment, a sky sensor 930 may be incorporated positioned to detect light levels generally above and in front of associated vehicle. The sky sensor 930 may be used to automatically control the reflectivity of a self-dimming element, the exterior lights of a controlled vehicle and/or the intensity of information displays. The interior rearview mirror may further include sun-load sensors for sensing light levels towards the driver side and passenger side of the vehicle so as to control the climate control system of the vehicle.

Additionally, the interior rearview mirror may include first, second, third, fourth and fifth operator interfaces 932a-932e located in the bezel 36. Each operator interface is shown to comprise a backlit information display "A," "AB," "A1," "49," and "12". It should be understood that these operator interfaces can be incorporated anywhere in the associated vehicle, for example, in the mirror case, accessory module, instrument panel, overhead console, dash board, seats, center console, etc. Suitable switch construction is described in detail in commonly assigned U.S. Pat. Nos. 6,407,468, 6,420,800, 6,426,568, and 6,471,362, as well as, commonly assigned U.S. Patent Application Publication No. US 2002/0024713 A1, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIGS. 23A-23C, 24A and 24B, it should be understood that fewer or more individual devices may be incorporated in any location within the associated vehicle and as described within the references incorporated herein.

A mounting bracket 29 is included for mounting the interior rearview mirror within a vehicle either to the windshield, or to the vehicle roof structure. It should be understood that a host of accessories may be incorporated into the mounting bracket 29 or into a housing 952 attached to the mounting bracket 29 such as a rain sensor (and therefore outside of a periphery of the button), a camera, a headlight control, additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays. An example of a rain sensor in a mounting bracket 29 is disclosed in commonly assigned U.S. Patent Application Publication No. US 2004-0232773 A1, the entire disclosure of which is incorporated in its entirety herein by reference.

The interior rearview mirror is shown in FIG. 23A to further comprise the circuit board 38 on which the compass sensor module (not shown) may be mounted, and a daughter board 962 with an input/output bus interface (not shown).

The electrical output signal from either, or both, of the sensors 926 and 928 may be used as inputs to a controller (not shown) to control the reflectivity of the reflective element 16 and/or the intensity of any one or all of the displays 905a and 905b. The details of various control circuits for use herewith are described in commonly assigned U.S. Pat. Nos. 5,883,605, 5,956,012, 6,084,700, 6,222,177, 6,244,716, 6,247,819, 6,249,369, 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module is described as being mounted to circuit board 38, it should be understood that the sensor module may be located within the mounting bracket 29, with an accessory module of the interior rearview mirror or at any location within an associated vehicle such as under a dash board, in an overhead console, a center console, a trunk, an engine compartment, etc. The above described compass systems may be integrated, at least in part, in a common control with information displays and/or may share components with the information displays. In addition, the status of these systems and/or the devices controlled thereby may be displayed on the associated information displays.

The circuit board 38 may comprise a controller (not shown), such as a microprocessor, and the daughter board 962 may comprise an information display 905a. The microprocessor may, for example, receive signal(s) from the compass sensor module and process the signal(s) and transmit signal(s) to the daughter board to the control display 905a to indicate the corresponding vehicle heading. As described herein and within the references incorporated by reference herein, the controller may receive signal(s) from light sensor(s), rain sensor(s), automatic vehicle exterior light controller(s) (not shown), microphone(s), global positioning systems (not shown), telecommunication systems (not shown), operator interface(s) and a host of other devices, and control the information display(s) to provide appropriate visual indications.

The controller (or controllers) used to control the compass system may, at least in part, control the reflectivity of the reflective element 16, exterior lights, the rain sensor, compass, information displays, windshield wipers, heater, defroster, defogger, air conditioning, telephone system, navigation system, security system, tire pressure monitoring system, a garage door opening transmitter, remote keyless entry, telemetry systems, voice recognition systems such as digital signal processor based voice actuation systems, and vehicle speed. The controller 796 (or controllers) may receive signals from switches and/or sensors associated with any of the devices described herein and in the references incorporated by reference herein to automatically manipulate any other device described herein or described in the references included by reference. The controller may be, at least in part, located outside the interior rearview mirror or may comprise a second controller elsewhere in the vehicle or additional controllers throughout the vehicle. The individual processors may be configured to communicate serially, in parallel, via BLUETOOTH™ protocol, wireless communication, over the vehicle bus, over a CAN bus or any other suitable communication. A multi-pin connector interface 964 may be provided for such external connections.

Exterior light control systems as described in commonly assigned U.S. Pat. Nos. 5,990,469, 6,008,486, 6,130,421, 6,130,448, 6,255,639, 6,049,171, 5,837,994, 6,403,942, 6,281,632, 6,291,812, 6,469,739, 6,465,963, 6,429,594, 6,379,013, 6,587,573, 6,611,610, 6,621,616, 6,774,988, and 6,861,809 U.S. Patent Application Publication No. US 2002/0005472 A1 and U.S. Patent Application Publication Nos. U.S. 2004-0143380 A1 and U.S. 2004-0008410 A1, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays. As disclosed in U.S. Pat. No. 6,587,573, both the compass sensors and the imaging sensor array 950, may be housed in accessory housing 952 attached to the mount bracket 29.

Moisture sensors and windshield fog detector systems are described in commonly-assigned U.S. Pat. Nos. 5,923,027, 6,313,457, 6,617,564 and 6,681,163, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The interior rearview mirror may further include one or more antennae 940 for receipt and/or transmission of RF signals. Appropriate receiving, transmitting, and/or processing circuitry may further be included in or attached to the interior rearview mirror. Such antennae may be used for a cellular telephone system, a BLUETOOTH™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in an interior rearview mirror system are disclosed in commonly assigned U.S. Pat. Nos. 6,215,389, 6,431,712 6,696,935, and 6,861,942, the entire disclosures of which are incorporated herein by reference. Examples of a GPS system incorporated in the interior rearview mirror are disclosed in commonly assigned U.S. Pat. Nos. 6,166,698, 6,297,781, 6,396,446, and in U.S. Patent Application Publication No. US 2002/0032510 A1, the entire disclosures of which are incorporated herein by reference. An example of a LORAN system incorporated in an interior rearview mirror system is disclosed in commonly assigned U.S. Patent Application Publication No. US 2002/0193946 A1, the entire disclosure of which is incorporated herein by reference. An example of both a telephone/telematics system and a BLUETOOTH™ system incorporated in an interior rearview mirror system is disclosed in commonly assigned U.S. Patent Application Publication No. US 2002/0032510 A1, the entire disclosure of which is incorporated herein by reference. Examples of a trainable garage door opening systems and RKE systems incorporated in an interior rearview mirror system are disclosed in U.S. Pat. No. 6,091,183, the entire disclosures of which are incorporated herein by reference.

The interior rearview mirror may further include an infrared (IR) transmitter/receiver for transmitting/receiving information to and from the interior rearview mirror and possibly to and from the vehicle. An example of such an interior rearview mirror system is disclosed in commonly-assigned U.S. Pat. No. 6,407,712, the entire disclosure of which is incorporated herein by reference.

The interior rearview mirror may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly assigned U.S. Pat. No. 6,186,698 may be used, the entire disclosure of which is incorporated herein by reference. Examples of backlit indicia panel displays are disclosed in commonly-assigned U.S. Pat. Nos. 6,170,956 6,356,376, 6,572,233 and 6,870,655, the entire disclosures of which are incorporated herein by reference. Various displays used in interior rearview mirror systems are disclosed in commonly assigned U.S. Pat. No. 6,356,376 and in U.S. Patent Application Publication No. US 2002/0154379 A1, the entire disclosures of which are incorporated herein by reference.

The wiring for the vehicle accessories in the interior rearview mirror may be run through the mounting bracket 29 and along the windshield (if the mounting bracket 29 does not already extend to the headliner) under a wire cover 37. An example of an interior rearview mirror system in which the wiring for accessories in the housing 12 are routed through the mounting bracket 29 is disclosed in commonly assigned U.S. Pat. No. 6,467,919, the entire disclosure of which is incorporated herein by reference.

While the present invention has been described as being implemented with the sensors positioned within the housing 12 of the interior rearview mirror, the sensors could be mounted in the mounting foot or in any other location of the interior rearview mirror. Further still, any or all of the various components of the inventive electronic compass may be mounted elsewhere in the vehicle. It will be further appreciated that certain embodiments of the present invention are novel and useful in vehicles such as land-based vehicles (i.e., automobiles, trucks, sport utility vehicles (SUVs), trains, motorcycles, bicycles, mopeds, scooters, snowmobiles, all-terrain vehicles (ATVs), military vehicles) as well as in other vehicles such as airplanes, marine vessels, and amphibious vehicles.

It is further contemplated that the rearview mirror assembly 10 of the present invention could be used with the quick-attach mirror mounting structure facilitating assembly as disclosed in U.S. Patent Application No. US 2004/0195486 A1, the entire contents of which are hereby incorporated herein by reference. The quick-attach mirror mounting structure facilitating assembly as disclosed in U.S. Patent Application No. US 2004/0195486 A1 further allows the rearview mirror assembly 10 to be assembled by moving all of the parts of the rearview mirror assembly 10 together to connect the reflective element 16 to the mount (both mechanically and electrically) along with all of the elements between the reflective element and the mount.

Although the present invention is described as utilizing a process whereby the signals output from the magnetic sensing circuit are plotted in reference to one another in a two- or three-dimensional coordinate system, an analogous approach may be to process and analyze the signals separately and then compare the results of the separate analysis to arrive at a similar result.

The above description is considered that of the preferred embodiments only. Modifications of the invention will occur to those skilled in the art and to those who make or use the invention. Furthermore, the foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention.

We claim:

1. A method of constructing a rearview mirror assembly comprising:
   providing a rear housing section with wiring connected to a first electrical connection device;
   providing a circuit board with a second electrical connection device;
   moving the circuit board and the rear housing section relatively towards each other to automatically mate the first electrical connection device and the second electrical connection device;
   providing the rear housing section with a flat mount connection panel portion;
   connecting a mount to the rear housing section at the flat mount connection panel portion;
   wherein the flat mount connection panel portion includes a center opening for routing of the wiring therethrough; and
   providing the rear housing section with clips for holding the wiring.

2. The method of constructing a rearview mirror assembly of claim 1, wherein:
   the mount comprises a two ball mount.

3. The method of constructing a rearview mirror assembly of claim claim 1, further including:
   providing a washer having a central opening therethrough;
   positioning the mount on a first side of the flat mount connection panel portion;
   positioning the washer on a second side of the flat mount connection panel portion;
   connecting the mount to the washer; and
   routing the wiring through the center opening of the flat mount connection panel portion and the central opening of the washer.

4. A method of constructing a rearview mirror assembly comprising:
   providing a rear housing section with wiring connected to a first electrical connection device;
   providing a circuit board with a second electrical connection device;
   moving the circuit board and the rear housing section relatively towards each other to automatically mate the first electrical connection device and the second electrical connection device; and
   providing the rear housing section with guide posts;
   wherein moving the circuit board and the rear housing section relatively towards each other includes aligning the circuit board using the guide posts by abutting the circuit board against the guide posts.

5. A method of constructing a rearview mirror assembly comprising:
   providing a rear housing section with wiring connected to a first electrical connection device;
   providing a circuit board with a second electrical connection device; and
   moving the circuit board and the rear housing section relatively towards each other to automatically mate the first electrical connection device and the second electrical connection device;
   wherein a first one of the first electrical connection device and the second electrical connection device comprises a housing having a funnel receiver for accepting a second one of the first electrical connection device and the second electrical connection device therein.

6. A method of constructing a rearview mirror assembly comprising:
   providing a rear housing section with wiring connected to a first electrical connection device;
   providing a circuit board with a second electrical connection device; and
   moving the circuit board and the rear housing section relatively towards each other to automatically mate the first electrical connection device and the second electrical connection device;
   wherein the first electrical connection device comprises a first electrical connection housing having at least one slot for accepting the wiring therein.

7. The method of constructing a rearview mirror assembly of claim 6, further including:
   providing the rear housing section with at least one connection clip flange;
   providing the first electrical connection housing of the first electrical connection device with at least one clip accepting opening; and connecting the first electrical connection device with the rear housing section by inserting the least one connection clip flange into the at least one clip accepting opening.

8. The method of constructing a rearview mirror assembly of claim 6, wherein:
the wiring comprises an outer sheath covering a plurality of wires, each of the wires having an internal wire member and an external sheath; and
the at least one slot for accepting the wiring therein comprises a plurality of slots, with at least one of the slots accepting one of the wires therein.

9. The method of constructing a rearview mirror assembly of claim 8, further including:
providing each of the slots with a knife member; and
exposing the internal wire member by inserting the wires into the slots and cutting the external sheath with the knife members, thereby electrically connecting the internal wire members to the knife members.

10. A method of constructing a rearview mirror assembly comprising:
providing a rear housing section with wiring connected to a first electrical connection device;
providing a circuit board with a second electrical connection device;
moving the circuit board and the rear housing section relatively towards each other to automatically mate the first electrical connection device and the second electrical connection device;
providing the circuit board with a third electrical connection device;
providing an reflective element with a fourth electrical connection device; and
moving the circuit board and the reflective element relatively towards each other to automatically mate the third electrical connection device and the fourth electrical connection device.

11. The method of constructing a rearview mirror assembly of claim 10, wherein:
moving the circuit board and the reflective element relatively towards each other allows the wiring to supply power to the reflective element.

12. The method of constructing a rearview mirror assembly of claim 10, wherein:
the reflective element comprises an electrochromic mirror subassembly including a front glass element and a rear glass element, with electrochromic material located between the front glass element and the rear glass element.

13. The method of constructing a rearview mirror assembly of claim 10, wherein:
the third electrical connection device comprises an conductive compressive member; and
further including abutting the conductive compressive member against the fourth electrical connection device.

14. The method of constructing a rearview mirror assembly of claim 13, wherein:
the fourth electrical connection device comprises a clip with a resilient flap; and
abutting the conductive compressive member with the fourth electrical connection device comprises abutting the conductive compressive member against the resilient flap.

15. The method of constructing a rearview mirror assembly of claim 10, wherein:
a first one of the third electrical connection device and the fourth electrical connection device comprises a receiver and a second one of the third electrical connection device and the fourth electrical connection device comprises a prong; and
moving the circuit board and the reflective element relatively towards each other to automatically mate the third electrical connection device and the fourth electrical connection device includes inserting the prong into the receiver.

16. The method of constructing a rearview mirror assembly of claim 15, wherein:
the receiver comprise a plurality of fingers, with the prong being inserted between the fingers.

17. A rearview mirror assembly comprising:
a rear housing section with wiring connected to a first electrical connection device;
a circuit board with a second electrical connection device; and
a mount;
wherein the first electrical connection device and the second electrical connection device are configured to automatically mate when the circuit board and the rear housing section are moved relatively towards each other;
wherein the rear housing section includes a flat mount connection panel portion;
wherein the mount is connected to the rear housing section at the flat mount connection panel portion;
wherein the flat mount connection panel portion includes a center opening for routing of the wiring therethrough; and
wherein the rear housing section includes clips for holding the wiring.

18. The rearview mirror assembly of claim 17, wherein:
the mount comprises a two ball mount.

19. The rearview mirror assembly of claim 17, further including:
a washer having a central opening therethrough;
the mount being positioned on a first side of the flat mount connection panel portion and the washer being positioned on a second side of the flat mount connection panel portion;
wherein the mount is connected to the washer; and
wherein the wiring is routed through the center opening of the flat mount connection panel portion and the central opening of the washer.

20. A rearview mirror assembly comprising:
a rear housing section with wiring connected to a first electrical connection device; and
a circuit board with a second electrical connection device;
wherein the first electrical connection device and the second electrical connection device are configured to automatically mate when the circuit board and the rear housing section are moved relatively towards each other;
wherein the rear housing section includes guide posts; and
wherein the circuit board is aligned within the rear housing section by abutting the circuit board against the guide posts.

21. A rearview mirror assembly comprising:
a rear housing section with wiring connected to a first electrical connection device; and
a circuit board with a second electrical connection device;
wherein the first electrical connection device and the second electrical connection device are configured to automatically mate when the circuit board and the rear housing section are moved relatively towards each other; and
wherein a first one of the first electrical connection device and the second electrical connection device comprises a housing having a funnel receiver for accepting a second one of the first electrical connection device and the second electrical connection device therein.

22. A rearview mirror assembly comprising:
a rear housing section with wiring connected to a first electrical connection device; and
a circuit board with a second electrical connection device;
wherein the first electrical connection device and the second electrical connection device are configured to automatically mate when the circuit board and the rear housing section are moved relatively towards each other; and
wherein the first electrical connection device comprises a first electrical connection housing having at least one slot for accepting the wiring therein.

23. The rearview mirror assembly of claim 22, wherein:
the rear housing section includes at least one connection clip flange;
the first electrical connection housing of the first electrical connection device includes at least one clip accepting opening; and
the least one connection clip flange is inserted into the at least one clip accepting opening.

24. The rearview mirror assembly of claim 22, wherein:
the wiring comprises an outer sheath covering a plurality of wires, each of the wires having an internal wire member and an external sheath; and
the at least one slot for accepting the wiring therein comprises a plurality of slots, with at least one of the slots accepting one of the wires therein.

25. The rearview mirror assembly of claim 24, wherein:
each of the slots includes a knife member; and
the internal wire member is exposed by inserting the wires into the slots and cutting the external sheath with the knife members, thereby electrically connecting the internal wire members to the knife members.

26. A rearview mirror assembly comprising:
a rear housing section with wiring connected to a first electrical connection device; and
a circuit board with a second electrical connection device;
wherein the first electrical connection device and the second electrical connection device are configured to automatically mate when the circuit board and the rear housing section are moved relatively towards each other; and
wherein the circuit board further includes a third electrical connection device; and
an reflective element with a fourth electrical connection device;
wherein the third electrical connection device and the fourth electrical connection device are configured to automatically mate when the circuit board and the reflective element are moved relatively towards each other.

27. The rearview mirror assembly of claim 26, wherein:
the wiring supplies power to the reflective element.

28. The rearview mirror assembly of claim 26, wherein:
the reflective element comprises an electrochromic mirror subassembly including a front glass element and a rear glass element, with electrochromic material located between the front glass element and the rear glass element.

29. The rearview mirror assembly of claim 26, wherein:
the third electrical connection device comprises an conductive compressive member; and
the conductive compressive member abuts the fourth electrical connection device.

30. The rearview mirror assembly of claim 29, wherein:
the fourth electrical connection device comprises a clip with a resilient flap; and
the conductive compressive member abuts the resilient flap.

31. The rearview mirror assembly of claim 26, wherein:
a first one of the third electrical connection device and the fourth electrical connection device comprises a receiver and a second one of the third electrical connection device and the fourth electrical connection device comprises a prong; and
the prong is inserted into the receiver.

32. The rearview mirror assembly of claim 31, wherein:
the receiver comprise a plurality of fingers, with the prong being inserted between the fingers.

33. A method of constructing a rearview mirror assembly comprising:
providing a circuit board with a first electrical connection device;
providing an reflective element with a second electrical connection device;
moving the circuit board and the reflective element relatively towards each other to automatically mate the first electrical connection device and the second electrical connection device;
wherein the first electrical connection device comprises an conductive compressive member; and
abutting the conductive compressive member against the second electrical connection device.

34. The method of constructing a rearview mirror assembly of claim 33, wherein:
the reflective element comprises an electrochromic mirror subassembly including a front glass element and a rear glass element, with electrochromic material located between the front glass element and the rear glass element.

35. The method of constructing a rearview mirror assembly of claim 33, wherein:
the second electrical connection device comprises a clip with a resilient flap; and
abutting the conductive compressive member with the second electrical connection device comprises abutting the conductive compressive member against the resilient flap.

36. A method of constructing a rearview mirror assembly comprising:
providing a circuit board with a first electrical connection device;
providing an reflective element with a second electrical connection device;
moving the circuit board and the reflective element relatively towards each other to automatically mate the first electrical connection device and the second electrical connection device;
wherein a first one of the first electrical connection device and the second electrical connection device comprises a receiver and a second one of the first electrical connection device and the second electrical connection device comprises a prong; and
moving the circuit board and the reflective element relatively towards each other to automatically mate the first electrical connection device and the second electrical connection device includes inserting the prong into the receiver.

37. The method of constructing a rearview mirror assembly of claim 36, wherein:
the receiver comprise a plurality of fingers, with the prong being inserted between the fingers.

38. A rearview mirror assembly comprising:
a circuit board with a first electrical connection device; and
a reflective element with a second electrical connection device;
wherein the first electrical connection device and the second electrical connection device are configured to automatically mate when the circuit board and the reflective element are moved relatively towards each other;
wherein the first electrical connection device comprises an conductive compressive member; and
wherein the conductive compressive member abuts the second electrical connection device.

39. The rearview mirror assembly of claim 38, wherein:
the wiring supplies power to the reflective element.

40. The rearview mirror assembly of claim 38, wherein:
the reflective element comprises an electrochromic mirror subassembly including a front glass element and a rear glass element, with electrochromic material located between the front glass element and the rear glass element.

41. The rearview mirror assembly of claim 38, wherein:
the second electrical connection device comprises a clip with a resilient flap; and
the conductive compressive member abuts the resilient flap.

* * * * *

UNITED STATES PATENT AND TRADEMARK OFFICE
CERTIFICATE OF CORRECTION

PATENT NO. : 7,746,535 B2  
APPLICATION NO. : 12/139956  
DATED : June 29, 2010  
INVENTOR(S) : Julie A. Kelley et al.

Page 1 of 1

It is certified that error appears in the above-identified patent and that said Letters Patent is hereby corrected as shown below:

Column 16

Claim 3, line 7, delete "claim" (second occurrence).

Signed and Sealed this
Eleventh Day of January, 2011

David J. Kappos
*Director of the United States Patent and Trademark Office*